United States Patent
Sechi et al.

(10) Patent No.: US 11,269,130 B2
(45) Date of Patent: Mar. 8, 2022

(54) TRANSPARENT RESIN COMPOSITION, RESIN MOLDED BODY, LAMP COVER, LAMP COVER FOR VEHICLES, COMBINATION LAMP COVER, AND VEHICLE

(71) Applicant: Mitsubishi Chemical Corporation, Tokyo (JP)

(72) Inventors: Youhei Sechi, Tokyo (JP); Tadayoshi Sawada, Tokyo (JP); Takashi Ookubo, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 17/012,826

(22) Filed: Sep. 4, 2020

(65) Prior Publication Data

US 2021/0003768 A1    Jan. 7, 2021

Related U.S. Application Data

(63) Continuation of application No. PCT/JP2019/008606, filed on Mar. 5, 2019.

(30) Foreign Application Priority Data

Mar. 7, 2018 (JP) .............................. JP2018-041052
Apr. 25, 2018 (JP) .............................. JP2018-083828

(51) Int. Cl.
*F21V 8/00* (2006.01)
*F21S 41/20* (2018.01)
(Continued)

(52) U.S. Cl.
CPC .......... *G02B 6/0051* (2013.01); *F21S 41/285* (2018.01); *G02B 1/045* (2013.01); *G02B 6/0041* (2013.01); *F21W 2107/10* (2018.01)

(58) Field of Classification Search
None
See application file for complete search history.

(56) References Cited

U.S. PATENT DOCUMENTS

2005/0272879 A1   12/2005   Kawai et al.
2011/0249939 A1   10/2011   Schmidt et al.
(Continued)

FOREIGN PATENT DOCUMENTS

CN   101313175 A     11/2008
EP   3 584 280 A1    12/2019
(Continued)

OTHER PUBLICATIONS

Office Action dated Nov. 10, 2020 in corresponding Japanese Patent Application No. 2019-516564 (with English Translation), 14 pages.
(Continued)

*Primary Examiner* — Britt D Hanley
(74) *Attorney, Agent, or Firm* — Oblon, McClelland, Maier & Neustadt, L.L.P.

(57) ABSTRACT

A transparent resin composition includes a transparent resin and a light diffusing agent which has an average particle diameter of 220 nm or more and 300 nm or less, in which a content proportion of the light diffusing agent is more than 4.0 mass ppm and less than 20 mass ppm with respect to the total mass of the transparent resin composition.

23 Claims, 6 Drawing Sheets

(51) Int. Cl.
  *G02B 1/04* (2006.01)
  *F21W 107/10* (2018.01)

(56) References Cited

U.S. PATENT DOCUMENTS

| 2012/0008338 | A1 | 1/2012 | Ono et al. |
| 2017/0023722 | A1 | 1/2017 | Schmidt et al. |

FOREIGN PATENT DOCUMENTS

| JP | 10-298237 | A | | 11/1998 | |
| JP | 2004-351649 | A | | 12/2004 | |
| JP | 1694910 | A | | 11/2005 | |
| JP | 2006-342211 | A | | 12/2006 | |
| JP | 101313175 | A | | 11/2008 | |
| JP | 2012-41471 | A | | 3/2012 | |
| JP | 2012-64533 | A | | 3/2012 | |
| JP | 2012-99413 | A | | 5/2012 | |
| JP | 2012-138503 | A | | 10/2012 | |
| JP | 2013-527968 | A | | 7/2013 | |
| JP | 2014-171 83 | A | | 1/2014 | |
| JP | 2014-84340 | A | | 5/2014 | |
| JP | 2017-76460 | A | | 4/2017 | |
| JP | 2017-147145 | A | | 8/2017 | |
| WO | WO 2007/058060 | A1 | | 5/2007 | |
| WO | WO 2010/113422 | A1 | | 10/2010 | |
| WO | WO-2010113422 | A1 | * | 10/2010 | ........... G02B 6/0041 |
| WO | WO 2018/151030 | A1 | | 8/2018 | |

OTHER PUBLICATIONS

International Search Report dated May 21, 2019 in PCT/JP2019/008606 filed Mar. 5, 2019 (with English translation), 4 pages.
Japanese Office Action dated Mar. 17, 2020 in Japanese Application 2019-516564 (with English translation), 13 pages.
Chinese Office Action dated Apr. 7, 2020 in Chinese Application 201980000524.1 (with English Translation), 29 pages.
Chinese Office Action dated Sep. 1, 2020 in Patent Application No. 201980000524.1 (with English translation), 22 pages.
Extended European Search Report dated Mar. 18, 2021 in European Patent Application No. 19763411.6, 10 pages.
Chinese Office Action dated May 8, 2021 in Chinese Patent Application No. 201980000524.1 (with unedited computer generated English translation), 33 pages.
Decision of Rejection issued in CN Application No. 201980000524.1, dated Oct. 11, 2021, w/English Translation.
Notice of Reasons for Refusal dated Jan. 25, 2022, in Japanese Patent Application No. 2021-020174 filed Feb. 10, 2021 (with machine generated English translation).
Notice of Reasons for Refusal dated Jan. 25, 2022, in Japanese Patent Application No. 2021-020175 filed Feb. 10, 2021 (with machine generated English translation).
Notice of Reasons for Refusal dated Jan. 25, 2022, in Japanese Patent Application No. 2021-020176 filed Feb. 10, 2021 (with machine generated English translation).

* cited by examiner

TRANSPARENT RESIN COMPOSITION, RESIN MOLDED BODY, LAMP COVER, LAMP COVER FOR VEHICLES, COMBINATION LAMP COVER, AND VEHICLE

TECHNICAL FIELD

The present invention relates to a transparent resin composition for providing a resin molded body having an excellent transparency, brightness, low coloring property, and balance between transparency and brightness.

The present invention relates to a vehicle lamp cover, a combination lamp cover, and a vehicle, which include the resin molded body.

The present invention relates to a lamp cover having an excellent transparency, brightness, low coloring property, and balance between transparency and brightness, a combination lamp cover including the lamp cover, and a vehicle.

This application is a continuation application of International Application No. PCT/JP2019/008606, filed on Mar. 5, 2019, which claims the benefit of priority of the prior Japanese Patent Application No. 2018-041052 filed in Japan on Mar. 7, 2018 and prior Japanese Patent Application No. 2018-083828 filed in Japan on Apr. 25, 2018, the contents of which are incorporated herein.

BACKGROUND ART

Transparent resins such as methacrylic-based resin, polycarbonate-based resin, and polystyrene-based resin are lighter than glass and, even among industrial synthetic resins, have an excellent balance among transparency, weather resistance, mechanical properties, and workability, thus, there is a demand for such resins in applications for vehicle interior/exterior members, lamp covers for illumination lamps, and light guides for planar light source devices (simply referred to below as "vehicle interior/exterior members or the like"). In particular, as vehicle interior/exterior members, methacrylic-based resins have recently been adopted in applications for vehicle lamp covers such as tail lamp covers or headlamp covers (also simply referred to below as "lamp covers") and vehicle members such as visors, meter panels, display components, and pillars.

For applications such as vehicle interior/exterior members, in particular, for applications as lamp covers, in terms of visibility, there is an increasing demand for a transparent resin composition which emits a high brightness when a light source is on.

In addition, in terms of the design property, there is a demand for transparency and a low presence when a light source is off and there is an increasing demand for a transparent resin composition with excellent transparency in which coloring is suppressed.

Generally, the higher the transparency of a material is, the less likely it is that incident light will be scattered and the more the brightness tends to decrease. However, in comparison with an application of a light guide plate or a planar light source formed only with a planar shape, for a lamp cover having a curved surface shape, the light incident on the lamp cover is emitted from a curved portion and the light guiding distance tends to be shortened, and, along with the extension of the light guiding distance due to the switch to LED light sources and the increasing size of vehicle members in recent years, there is a demand to able to maintain a high brightness even when the light guiding distance is long.

That is, there is an increasing demand for a transparent resin composition having an excellent balance between transparency and brightness.

For example, as a technique for improving the brightness, light emission unevenness, and color unevenness of a light guide, the Examples of Patent Literature 1 disclose a light guide plate in which a methacrylic-based resin contains, as a light diffusing agent, titanium dioxide having a ratio ($D_{90}/D_{10}$) of a 90% cumulative average particle diameter ($D_{90}$) to a 10% cumulative average particle diameter ($D_{10}$) in a range of 2.8 to 10 in a particle diameter cumulative distribution curve.

As a technique for improving the brightness of a light guide, Patent Literature 2 discloses a light guide formed of a methacrylic-based resin for which a relationship between the content of titanium dioxide and the optical path length is defined, and, in the Examples, titanium dioxide is contained as a light diffusing agent in a range of 0.6 to 2.4 ppm.

As a technique for improving transparency and brightness, Patent Literature 3 discloses a light emitting body in which a methacrylic-based resin contains light diffusing agent particles, and, in the Examples, titanium dioxide with an average particle diameter of 1 μm is contained as a light diffusing agent.

In addition, as a technique for improving the brightness of a light guide, Patent Literature 4 discloses a light guide in which a methacrylic-based resin contains a specific amount of inorganic fine particles having a specific average particle diameter and, in the Examples, titanium oxide having an average particle diameter of 200 nm or 400 nm is contained as a light diffusing agent.

In addition, as a technique for improving the brightness of a light guide, Patent Literature 5 discloses a light guide in which a methacrylic-based resin contains 1.2 ppm of titanium dioxide particles having an average particle diameter of 200 nm as a light diffusing agent.

In addition, as a technique for improving transparency and brightness, Patent Literature 6 discloses a methacrylic-based resin light guide in which a methacrylic-based resin contains 10 ppm of titanium dioxide particles having an average particle diameter of 200 nm as a light diffusing agent.

CITATION LIST

Patent Literature

[Patent Literature 1]
  WO2007/058060
[Patent Literature 2]
  Japanese Unexamined Patent Application, First Publication No. S/H 2017-076460
[Patent Literature 3]
  WO2010/113422
[Patent Literature 4]
  Japanese Unexamined Patent Application, First Publication No. S/H 2004-351649 A
[Patent Literature 5]
  Published Japanese Translation No. S/H 2013-527968 of the PCT International Publication
[Patent Literature 6]
  Japanese Unexamined Patent Application, First Publication No. S/H 2006-342211

SUMMARY OF INVENTION

Technical Problem

However, for the light guide plate disclosed in Patent Literature 1 with a titanium dioxide content proportion of 4 mass ppm or less, the brightness of the light guide plate was insufficient. In addition, the light guide plate having a titanium dioxide content proportion of 20 mass ppm or more had an insufficient balance of transparency and brightness. Furthermore, since the spread of the particle diameter distribution of titanium dioxide ($D_{90}/D_{10}$) was large, the balance between the transparency and the brightness of the light guide plate was insufficient.

In the light guide disclosed in the Examples of Patent Literature 2, the brightness of the light guide plate was insufficient as the content proportion of titanium dioxide was small.

The light guide disclosed in the Example of Patent Literature 3 had an insufficient balance between transparency and brightness as the particle diameter of titanium dioxide was large. In addition, in a case of being used as a light guide having a curved surface shape, incident light was emitted at the curved surface portion, thus, there was a problem in use as a lamp cover application.

Regarding the light guide disclosed in the Examples of Patent Literature 4, as the particle diameter of titanium dioxide was as small as 200 nm, there was a yellowish tint, the haze value was low, and the brightness was insufficient. Alternatively, since the particle diameter of titanium dioxide was as large as 400 nm, the balance between transparency and brightness was insufficient. That is, it was not possible to use any of the above for a lamp cover.

The light guides disclosed in the Examples of Patent Literature 5 and 6 had titanium dioxide with a small particle diameter and a small content proportion, thus, the haze value was low and the brightness was insufficient. That is, use was not possible for a lamp cover.

The present invention has an object of solving these problems. That is, an object of the present invention is to provide a transparent resin composition for providing a resin molded body having an excellent transparency, brightness, low coloring property, and balance between transparency and brightness.

The transparent resin composition and resin molded body of the present invention emit high brightness when a light source is turned on and thus are excellent in visibility and are transparent and have a low presence when a light source is turned off and thus are excellent in the design property and suitable as a lamp cover, in particular, a vehicle lamp cover or a combination lamp cover having a curved surface shape.

Solution to Problem

As a result of repeated studies to solve the above problems, the present inventors completed the present invention.

[1] A transparent resin composition including a transparent resin, and a light diffusing agent which has an average particle diameter of 220 nm or more and 300 nm or less, in which a content proportion of the light diffusing agent is more than 4.0 mass ppm and less than 20 mass ppm with respect to a total mass of the transparent resin composition.

[2] The transparent resin composition according to [1], in which a ratio ($D_{90}/D_{10}$) of a 90% cumulative average particle diameter ($D_{90}$) to a 10% cumulative average particle diameter ($D_{10}$) in a cumulative distribution curve of particle diameters of the light diffusing agent is 1.2 or more and 2.5 or less.

[3] The transparent resin composition according to [1] or [2], in which a refractive index difference between the transparent resin and the light diffusing agent is 0.3 or more and 3.0 or less.

[4] The transparent resin composition according to any one of [1] to [3], in which the transparent resin is at least one type selected from a methacrylic-based resin, a polycarbonate-based resin, and a polystyrene-based resin.

[5] The transparent resin composition according to any one of [1] to [4], in which the light diffusing agent is titanium dioxide particles.

[6] The transparent resin composition according to any one of [1] to [5], in which a content proportion of the light diffusing agent is 6.5 mass ppm or more and 18 mass ppm or less with respect to a total mass of the transparent resin composition.

[7] The transparent resin composition according to any one of [1] to [5], in which a content proportion of the light diffusing agent is 7.2 mass ppm or more and 16 mass ppm or less with respect to a total mass of the transparent resin composition.

[8] A resin molded body including the transparent resin composition according to any one of [1] to [7].

[9] A resin molded body including a transparent resin composition containing a transparent resin and a light diffusing agent which has an average particle diameter of 220 nm or more and 300 nm or less, in which a total light transmittance (Tt) measured according to ISO 13468 in a thickness direction is 75% or more and less than 91%, a haze value (H) measured according to ISO14782 in the thickness direction is 1.0% or more and 14.5% or less, and yellowness index (YI) in the thickness direction, total light transmittance (Tt), and haze value (H), measured according to ISO17223, satisfy Expression (1) and Expression (2).

$$0.04 \leq H/Tt \leq 0.18 \tag{1}$$

$$0.10 \leq YI/H \leq 0.28 \tag{2}$$

[10] A resin molded body including a transparent resin composition containing a transparent resin and a light diffusing agent which has an average particle diameter of 220 nm or more and 300 nm or less, in which a total light transmittance (Tt) measured according to ISO 13468 in a thickness direction is 75% or more and less than 91%, a haze value (H) measured according to ISO14782 in the thickness direction is 1.0% or more and 14.5% or less, and a brightness attenuation coefficient ($m^{-1}$) is 10 or more and 30 or less when the resin molded body guides light in a length direction of the resin molded body while scattering light in the thickness direction of the resin molded body, and a brightness retention coefficient ($m^{-1}/\%$) obtained by dividing the brightness attenuation coefficient by the haze value (%) of the resin molded body is 1.5 or more and 3.5 or less.

[11] The resin molded body according to [9] or [10], further including a light incidence end surface provided in a region of at least a part of a side end surface of the resin molded body, and a light emission surface provided on at least one main surface of the resin molded body, in which an in-plane average brightness, which is an average value of brightness of the light emission surface, is 500 cd/$m^2$ or more.

[12] The resin molded body according to any one of [9] to [11], in which, in a cumulative frequency distribution curve of the particle diameter of the light diffusing agent, a ratio ($D_{90}/D_{10}$) of the particle diameter ($D_{90}$) having a cumulative frequency of 90% and the particle diameter ($D_{10}$) having a cumulative frequency of 10% is 1.2 or more and 2.5 or less.

[13] The resin molded body according to any one of [9] to [12], in which a content proportion of the light diffusing agent is preferably more than 4.0 mass ppm and less than 20 mass ppm with respect to a total mass of the transparent resin composition, more preferably 6.5 mass ppm or more and 18 mass ppm or less, and even more preferably 7.2 mass ppm or more and 16 mass ppm or less.

[14] The resin molded body according to any one of [9] to [13], in which the transparent resin is at least one type selected from methacrylic-based resin, polycarbonate-based resin, and polystyrene-based resin.

[15] The resin molded body according to any one of [9] to [14], in which the light diffusing agent is titanium dioxide particles.

[16] The resin molded body according to any one of [8] to [15], in which the resin molded body is any one selected from the group consisting of a vehicle interior/exterior member, a lamp cover for an illumination lamp, and a light guide for a planar light source device.

[17] The resin molded body according to [16], in which the vehicle interior/exterior member is at least one type selected from the group consisting of a vehicle lamp cover, a visor, a meter panel, and a pillar.

[18] A vehicle lamp cover including the resin molded body according to any one of [8] to [15].

[19] A combination lamp cover including a transparent or semi-transparent headlamp cover or a rear lamp cover which does not substantially include a light diffusing agent; and the vehicle lamp cover according to [18], in which the vehicle lamp cover is arranged on an outer edge, or in a region of at least a part of the outer edge, of the headlamp cover or the rear lamp cover.

[20] A vehicle including the vehicle lamp cover according to [18] or the combination lamp cover according to [19].

[21] A lamp cover, in which a total light transmittance (Tt) measured according to ISO 13468 in a thickness direction is 75% or more and less than 91%, a haze value (H) measured according to ISO14782 in the thickness direction is 1.0% or more and 14.5% or less, a yellowness index (YI) measured according to ISO17223 in the thickness direction is 7.0 or less, and H/Tt and YI/H satisfy Expression (3) and Expression (4).

$$0.01 \leq H/Tt \leq 0.2 \quad (3)$$

$$-1.0 \leq YI/H \leq 1.0 \quad (4)$$

[22] A lamp cover, in which a total light transmittance (Tt) measured according to ISO 13468 in a thickness direction is 75% or more and less than 91%, a haze value (H) measured according to ISO14782 in the thickness direction is 1.0% or more and 14.5% or less, and a yellowness index (YI) measured according to ISO17223 in the thickness direction is 7.0 or less, and a brightness retention coefficient ($m^{-1}$/%) obtained by dividing a brightness attenuation coefficient ($m^{-1}$) when the lamp cover guides light in a length direction of the lamp cover while scattering light in the thickness direction of the lamp cover, by a haze value (%) of the lamp cover is 1.5 or more and 3.5 or less.

[23] The lamp cover according to [21] or [22], further including a transparent resin; and a light diffusing agent, in which a content proportion of the light diffusing agent is 0.05 to 20 mass ppm with respect to 100 parts by mass of the transparent resin, and an average particle diameter of the light diffusing agent is 150 to 500 nm.

[24] The lamp cover according to [21] or [22], further including a transparent resin; and a light diffusing agent, in which a content proportion of the light diffusing agent is 1.0 to 15 mass ppm with respect to 100 parts by mass of the transparent resin, and an average particle diameter of the light diffusing agent is 220 to 300 nm.

[25] The lamp cover according to [23] or [24], in which the transparent resin is at least one type selected from methacrylic-based resin, polycarbonate-based resin, and polystyrene-based resin.

[26] The lamp cover according to any one of [23] to [25], in which a refractive index difference between the transparent resin and the light diffusing agent is 0.3 or more and 3.0 or less.

[27] The lamp cover according to any one of [23] to [26], in which the light diffusing agent is titanium dioxide particles.

[28] The lamp cover according to any one of [21] to [27], further including a light incidence end surface provided in a region of at least a part of a side end surface of the lamp cover; and a light emission surface provided on at least one main surface of the lamp cover, in which an in-plane average brightness, which is an average value of brightness on the light emission surface, is 500 cd/m² or more.

[29] A combination lamp cover including a transparent or semi-transparent headlamp cover or a rear lamp cover which does not substantially include a light diffusing agent; and the lamp cover according to any one of [21] to [28], in which the lamp cover is arranged in a region of at least a part of an outer periphery or an outer frame of the headlamp cover or the rear lamp cover.

[30] A vehicle including the lamp cover according to any one of [21] to [28] or the combination lamp cover according to [29].

Advantageous Effects of Invention

According to the present invention, it is possible to stably provide a transparent resin composition having an excellent transparency, brightness, low coloring property, and balance between transparency and brightness.

The resin molded body manufactured from the transparent resin composition of the present invention is transparent and has a low presence when a light source is turned off and thus is excellent in the design property and emits a high brightness when a light source is turned on and thus is excellent in visibility, that is, the balance between transparency and brightness is excellent, thus, the resin molded body is suitable as a vehicle interior/exterior member, a lamp cover for an illumination lamp, and a light guide for a planar light source device, in particular, as a vehicle lamp cover for a vehicle interior/exterior member.

According to the present invention, it is possible to stably provide a lamp cover having an excellent transparency, brightness, low coloring property, and balance between transparency and brightness.

Such a lamp cover emits a high brightness when a light source is turned on and thus is excellent in visibility and is transparent and has a low presence when a light source is turned off and thus is excellent in the design property, thus, the lamp cover is suitable for a lamp cover, in particular, a tail lamp cover, a headlamp cover, or a combination lamp cover of a vehicle member.

DESCRIPTION OF EMBODIMENTS

Figure 1:
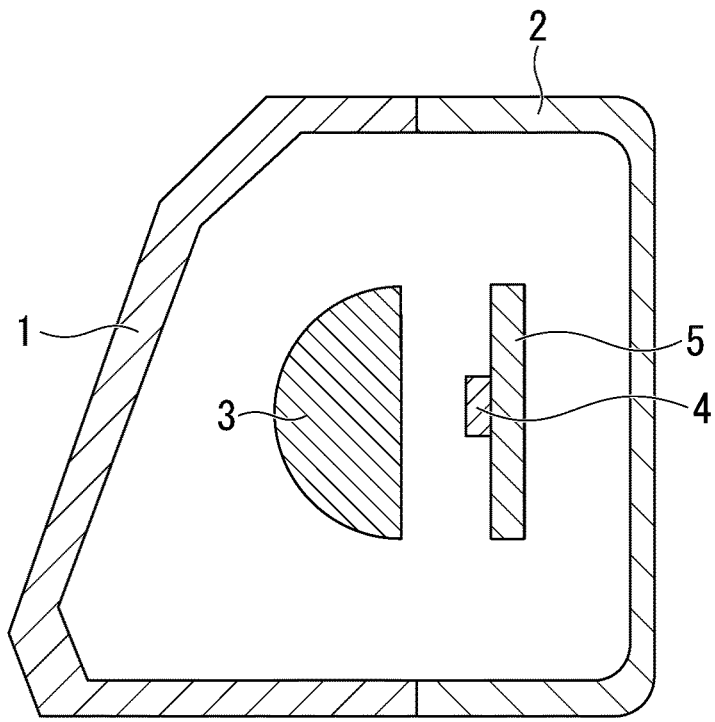
FIG. 1 is a schematic cross-sectional diagram showing an example of a lamp using the lamp cover of the present invention.

In the present invention, "(meth)acrylic acid" means at least one type selected from "acrylic acid" and "methacrylic acid".

In the present invention, "monomer" means an unpolymerized compound and "repeating unit" means a unit derived from the monomer formed by polymerizing the monomer. The repeating unit may be a unit directly formed by a polymerization reaction, or a unit in which a part of the unit is converted into another structure by treating the polymer.

In the present invention, "mass %" indicates the content proportion of a specific component included in the total mass of 100 mass %.

Unless otherwise specified, a numerical range represented by "to" in the present specification means a range including the numerical values described before and after "to" as the lower limit value and the upper limit value, and "A to B" means A or more and B or less.

In the present invention, "transparent" means that the total light transmittance measured according to JIS K7105 is 75% or more.

In the present invention, "semi-transparent" means that the total light transmittance measured according to JIS K7105 is 50% or more and less than 75.

In the present invention, the "lamp cover" is for protecting the light source and transmitting the light from the light source to be irradiated to the outside.

In the present invention, the "light source" means a light emitting body which emits light by utilizing electricity.

In the present invention, the "combination lamp cover" is a lamp cover provided on the front surface side of a light source of a combination lamp in a vehicle such as an automobile or a motorcycle so as to cover the front surface of the light source and means a lamp cover configured by combining a lamp cover portion which does not substantially include a light diffusing agent and a lamp cover portion which includes a light diffusing agent. In the present invention, "vehicle" means a vehicle with wheels.

A specific description will be given below of the present invention, but the present invention is not limited to these embodiments.

The present invention is a vehicle including a transparent resin composition according to a first embodiment, a resin molded body including the transparent resin composition according to a second embodiment, a vehicle lamp cover including the resin molded body according to a third embodiment, a combination lamp cover having the vehicle lamp cover according to a fourth embodiment, and the vehicle lamp cover or the combination lamp cover according to a fifth embodiment.

Furthermore, the present invention is for a vehicle provided with a combination lamp cover having a lamp cover according to a sixth embodiment and the lamp cover according to a seventh embodiment, and the lamp cover or the combination lamp cover according to an eighth embodiment.

<Transparent Resin Composition>

A description will be given of a transparent resin composition which is the first embodiment of the present invention.

The transparent resin composition of the present invention is a transparent resin composition including a transparent resin described below and a light diffusing agent described below.

The transparent resin composition of the present invention including the transparent resin described below gives the obtained resin molded body excellent transparency.

The transparent resin composition of the present invention including the light diffusing agent described below gives the obtained resin molded body an excellent brightness, low coloring property, and balance between transparency and brightness.

In addition, in the transparent resin composition of the present invention, from the viewpoint of the obtained resin molded body having an excellent brightness and balance between transparency and brightness, the lower limit of the content proportion of the light diffusing agent is preferably more than 4.0 mass ppm with respect to the total mass of the transparent resin composition. 6.5 mass ppm or more is more preferable, and 7.2 mass ppm or more is even more preferable. On the other hand, from the viewpoint of the obtained resin molded body having an excellent transparency and balance between transparency and brightness, the upper limit of the content proportion of the light diffusing agent is preferably less than 20 mass ppm with respect to the total mass of the transparent resin composition. 18 mass ppm or less is more preferable, and 16 mass ppm or less is even more preferable. It is possible to arbitrarily combine the upper limits and lower limits described above. Alternatively, the content proportion of the light diffusing agent of the transparent resin composition is preferably more than 4.0 mass ppm and less than 20 mass ppm with respect to the total mass of the transparent resin composition, more preferably 6.5 mass ppm or more and 18 mass ppm or less, and even more preferably 7.2 mass ppm or more and 16 mass ppm or less.

As a more preferable embodiment of the transparent resin composition of the present invention, from the viewpoint of the obtained resin molded body having an excellent transparency, brightness, low coloring property, and balance between transparency and brightness, a light diffusing agent which has an average particle diameter of 220 to 300 nm is preferably included at a content proportion of more than 4 mass ppm and less than 20 mass ppm with respect to the total mass of the transparent resin composition.

In an even more preferable embodiment of the transparent resin composition of the present invention, from the viewpoint of a resin molded body having a curved surface shape having a superior transparency, brightness, low coloring property, and balance between transparency and brightness, a light diffusing agent which has an average particle diameter of 220 to 300 nm is preferably included at a content proportion of 6.5 mass ppm or more and 18 mass ppm or less with respect to the total mass of the transparent resin composition, and more preferably included at a content proportion of 7.2 mass ppm or more and 16 mass ppm or less.

In the transparent resin composition of the present invention, from the viewpoint that it is possible to favorably maintain the brightness of the obtained resin molded body, the lower limit of the refractive index difference between the transparent resin and the light diffusing agent is preferably 0.3 or more, and more preferably 0.8 or more. On the other hand, from the viewpoint that it is possible to favorably maintain the transparency of the obtained resin molded body, the upper limit of the refractive index difference is preferably 3.0 or less, and more preferably 2.0 or less. It is possible to arbitrarily combine the upper limits and lower limits described above. Specifically, the refractive index difference between the transparent resin and the light diffusing agent is preferably 0.3 or more and 3.0 or less, and more preferably 0.8 or more and 2.0 or less. In the present specification, the "refractive index" is a value measured by the Abbe method using a sodium d line (589 nm).

<Transparent Resin>

The transparent resin is one constituent component of the transparent resin composition of the present invention.

The type of the transparent resin is not particularly limited as long as it is a transparent thermoplastic resin having a high light transmittance in the visible light region and examples thereof include a transparent thermoplastic resin in which the total light transmittance measured according to ISO13468 is 70% or more, and a haze value measured according to ISO14782 is 15% or less. Specifically, from among transparent thermoplastic resins exemplified by methacrylic-based resin, polycarbonate-based resin, polystyrene-based resin, and methyl methacrylate-styrene-based resin (MS resin), one type selected according to the desired characteristics may be used alone or two or more types may be mixed and used. Among the above, a polycarbonate-based resin is preferable in terms of heat resistance and impact resistance, and a methacrylic-based resin is preferable in terms of transparency and weather resistance.

(Methacrylic-Based Resin)

For the methacrylic-based resin which is able to be used as the transparent resin in the present invention, the methacrylic-based resin has favorable transparency and thus, examples thereof include an MMA copolymer in which a content ratio of a homopolymer of methyl methacrylate (abbreviated below as "MMA") or a repeating unit derived from MMA (abbreviated below as "MMA unit") is 70% by mass or more and less than 100% by mass with respect to the total mass of the methacrylic-based resin.

As the MMA copolymer, it is possible to use a polymer including 70 mass % or more and less than 100 mass % of the MMA unit and more than 0 mass % and 30 mass % or less of repeating units derived from other monomers described below (abbreviated below as "other monomer units") with the total mass of the MMA copolymer as 100 mass %. A polymer containing 85 to 100% by mass of MMA units and 0 to 15% by mass of other monomer units is more preferable, and a polymer containing 90 to 100% by mass of MMA units and 0 to 10% by mass of other monomer units is even more preferable.

The other monomer is not particularly limited as long as it is a monomer copolymerizable with MMA, and examples thereof include the following a) to f).

a) (Meth)acrylic acid ester compounds other than MMA such as methyl acrylate, ethyl(meth)acrylate, n-butyl(meth)acrylate, isobutyl(meth)acrylate, hexyl(meth)acrylate, heptyl(meth)acrylate, 2-ethylhexyl(meth)acrylate, n-octyl(meth)acrylate, n-nonyl(meth)acrylate, isononyl(meth)acrylate, decyl(meth)acrylate, undecyl(meth)acrylate, n-amyl(meth)acrylate, isoamyl(meth)acrylate, lauryl(meth)acrylate, benzyl(meth)acrylate, phenyl(meth)acrylate, cyclohexyl(meth)acrylate, methoxyethyl(meth)acrylate, ethoxyethyl(meth)acrylate, 2-naphthyl(meth)acrylate, and phenoxymethyl(meth)acrylate.

b) Aromatic vinyl compounds such as styrene, α-methylstyrene, o-methylstyrene, p-methylstyrene, o-ethylstyrene, p-ethyl styrene, o-chlorostyrene, p-chlorostyrene, p-methoxystyrene, p-acetoxystyrene, α-vinylnaphthalene, and 2-vinylfluorene.

c) Unsaturated nitrile compounds such as acrylonitrile, α-chloroacrylonitrile, α-methoxyacrylonitrile, methacrylonitrile, and vinylidene cyanide.

d) Ethylenically unsaturated ether compounds such as methyl vinyl ether, ethyl vinyl ether, n-propyl vinyl ether, isopropyl vinyl ether, methyl allyl ether, and ethyl allyl ether.

e) Vinyl halide compounds such as vinyl chloride, vinylidene chloride, 1,2-dichloroethylene, vinyl bromide, vinylidene bromide, and 1,2-dibromoethylene.

f) Aliphatic conjugated diene-based compounds such as 1,3-butadiene, 2-methyl-1,3-butadiene, 2,3-dimethyl-1,3-butadiene, 2-neopentyl-1,3-butadiene, 2-chloro-1,3-butadiene, 1,2 dichloro-1,3-butadiene, 2,3-dichloro-1,3-butadiene, 2-bromo-1,3-butadiene, 2-cyano-1,3-butadiene, substituted linear conjugated pentadienes, and linear and side chain conjugated hexadienes.

These other monomers may be used alone as one type or in a combination of two or more types.

Among these other monomers, from the viewpoint that the original performance of the methacrylic-based resin is not easily impaired and the obtained resin molded body has excellent thermal decomposition resistance, alkyl acrylates in which an alkyl group portion has 1 to 8 carbon atoms are preferable, methyl acrylate, ethyl acrylate, and n-butyl acrylate are more preferable, and methyl acrylate and ethyl acrylate are even more preferable.

The polymerization method when polymerizing the monomer component is not particularly limited and, for example, it is possible to adopt known polymerization methods such as suspension polymerization, solution polymerization, and bulk polymerization, but among the above, bulk polymerization is preferable. It is possible to adopt both batch type and continuous type bulk polymerization, for example, it is possible to obtain a polymer with high productivity by a method in which, while continuously supplying the monomer component, the polymerization initiator, and the like into a reaction container, a partial polymer obtained by holding the result in the reaction container for a predetermined time is continuously extracted.

The polymerization initiator used when polymerizing the monomer component is not particularly limited and, for example, it is possible to use known radical polymerization initiators such as known azo compounds such as azobisisobutyronitrile, or known peroxides such as 1,1-di(t-butylperoxy)cyclohexane. The polymerization initiators may be used alone as one type or used in a combination of two or more types.

When polymerizing the monomer component, it is possible to use a chain transfer agent to adjust the molecular weight of the methacrylic-based resin. The type of chain transfer agent is not particularly limited and preferable examples thereof include mercaptans such as n-butyl mercaptan, n-octyl mercaptan, n-dodecyl mercaptan, and 2-ethylhexyl thioglycolate, and the like. The chain transfer agents may be used alone as one type or used in a combination of two or more types.

The weight average molecular weight (Mw) of the methacrylic-based resin of the present invention is not particularly limited and is able to be appropriately set by a person skilled in the art according to the shape and size of the resin molded body to be obtained, the processing method of the resin molded body, or the like. The weight average molecular weight (Mw) is generally set in a range of 20,000 to 1,000,000, And, in an injection molding application, set in the range of 50,000 to 200,000. In the present specification, the number average molecular weight is a value measured using gel permeation chromatography using standard polymethyl methacrylate as a standard sample.

Commercial products of methacrylic-based resin include Acrypet VH, MD, and MF (trade names, manufactured by Mitsubishi Chemical Corporation).

(Polycarbonate-Based Resin)

Examples of the polycarbonate resin able to be used as the transparent resin in the present invention include resins obtained by reacting a known dihydric phenol with a known carbonylating agent by an interfacial polycondensation method, a melt transesterification method, or the like; resins obtained by polymerizing a known carbonate prepolymer by a solid-phase transesterification method or the like; resins obtained by polymerizing a known cyclic carbonate compound by a ring-opening polymerization method, and the like.

Commercially available polycarbonate-based resins include Panlite series (trade name, manufactured by Teijin Ltd.), Iupilon series (trade name, manufactured by Mitsubishi Engineering-Plastics Corporation), SD Polyca series (trade name, manufactured by Sumitomo Dow), Caliber (trade name, manufactured by Dow Chemical Company), CZ series and PCZ series (trade name, manufactured by Mitsubishi Gas Chemical Co., Inc.), APEC series (trade name, manufactured by Bayer Co., Ltd.), and the like.

(Polystyrene-Based Resin)

Examples of the polystyrene-based resin able to be used as the transparent resin in the present invention include a styrene copolymer in which the content ratio of a homopolymer of styrene (abbreviated below as "St") or a repeating unit derived from St (abbreviated below as "St unit") is 70% by mass or more and less than 100% by mass with respect to the total mass of the polystyrene-based resin.

Specific examples of polystyrene-based resins include polystyrene, styrene-acrylonitrile resin, acrylonitrile-butadiene-styrene resin, and methyl methacrylate-styrene resin (MS resin). Methyl methacrylate-styrene resin is preferable.

Commercially available products of polystyrene include PSJ polystyrene and ET series (trade name, manufactured by PS Japan Corporation).

Commercially available products of MS resin include Estyrene MS series (trade name, manufactured by Nippon Steel & Sumikin Materials Co., Ltd.), Cevian MAS series, and MAS series (trade name, manufactured by Daicel Polymer Ltd.).

<Light Diffusing Agent>

The light diffusing agent is one of the constituent components of the transparent resin composition of the present invention.

The transparent resin composition of the present invention including the light diffusing agent of the present invention gives the obtained resin molded body and lamp cover an excellent transparency, brightness, low coloring property, and balance between transparency and brightness.

In a case where a resin molded body including the transparent resin composition of the present invention is used for an edge light type vehicle interior/exterior member or a light guide for a planar light source device, when incident light from a light source scatters upon the light diffusing agent in the resin molded body, if the particle diameter of the light diffusing agent is excessively small, the ratio of forward scattering increases and the ratio of rectangular scattering and back scattering tends to decrease, while if the particle diameter of the light diffusing agent is excessively large, the ratio of back scattering increases and the ratio of forward scattering and rectangular scattering decreases. That is, if the particle diameter of the light diffusing agent is excessively small or excessively large, the brightness of the rectangular scattering required for the edge light type vehicle interior/exterior member and the light guide for the planar light source device tends to be insufficient. In particular, the influence thereof is remarkable in a lamp cover having a curved surface shape.

In addition, the smaller the particle diameter of the light diffusing agent is, the more blue light with a relatively short wavelength in the wavelength range of incident visible light is scattered by the fine particles to spread a yellowish tint. Therefore, when the particle diameter of the light diffusing agent is increased, the light diffusing property may decrease and it is necessary to increase the added amount of the light diffusing agent in order to obtain sufficient brightness. When the added amount of the light diffusing agent is increased, the brightness is increased, but the transparency is lowered, and the balance between the transparency and the brightness tends to be impaired.

Furthermore, it is known that, the smaller the refractive index difference between the light diffusing agent and the transparent resin is, the more the hue changes between the light observed near the light source incident side end surface of the light guide and the light observed at a position distant from the light incident side end surface.

However, in the transparent resin composition of the present invention, by optimizing the combination of the particle diameter of the light diffusing agent and the content proportion of the light diffusing agent, not only is the brightness of the rectangular scattering excellent, but it is also possible to make the brightness excellent over all angles measured with respect to the normal of the obtained resin molded body.

In particular, in a lamp cover having a curved surface shape, the effect described above is remarkable, thus, by optimizing the combination of the particle diameter of the light diffusing agent, the refractive index difference between the light diffusing agent and the transparent resin, and the content of the light diffusing agent, not only is the brightness of the rectangular scattering excellent, but it is also possible to make the brightness excellent over all angles measured with respect to the normal of the lamp cover.

The lower limit of the average particle diameter of the light diffusing agent of the present invention is preferably 220 nm or more from the viewpoint of the obtained resin molded body having an excellent brightness and low coloring property. The upper limit of the average particle diameter is preferably 300 nm or less, and more preferably 280 nm or less from the viewpoint of the obtained resin molded body having excellent transparency. A description will be given below of the method for measuring the average particle diameter of the light diffusing agent.

In the lamp cover of the present invention, the lower limit of the average particle diameter of the light diffusing agent is preferably 150 nm or more, and more preferably 220 nm or more from the viewpoint of the lamp cover having an excellent brightness and low coloring property. The upper limit of the average particle diameter is preferably 500 nm or less and more preferably 300 nm or less, from the viewpoint of being able to maintain favorable transparency of the lamp cover. It is possible to arbitrarily combine the upper limits and lower limits described above. Specifically, the average particle diameter of the light diffusing agent is preferably 150 to 500 nm, and more preferably 220 to 300 nm.

In addition, the lower limit of the refractive index difference between the transparent resin and the light diffusing agent is preferably 0.3 or more, and more preferably 0.8 or more from the viewpoint that it is possible to favorably maintain the brightness in the lamp cover. The upper limit of the refractive index difference is preferably 3.0 or less, and more preferably 2.0 or less, from the viewpoint that it is possible to favorably maintain the transparency of the lamp cover. It is possible to arbitrarily combine the upper limits and lower limits described above. Specifically, the refractive index difference between the transparent resin and the light diffusing agent is preferably 0.3 to 3.0, and more preferably 0.8 to 2.0.

In a more preferable embodiment, the mixture including the transparent resin and the light diffusing agent preferably includes a light diffusing agent which has an average particle diameter of 150 to 500 nm at a content proportion of 0.05 to 20 mass ppm with respect to the total mass of the mixture from the viewpoint of the lamp cover having an excellent transparency, brightness, low coloring property, and balance between transparency and brightness.

In an even more preferable embodiment, from the viewpoint of the lamp cover having a curved surface shape having a superior transparency, brightness, low coloring property, and balance between transparency and brightness, the mixture more preferably includes a light diffusing agent which has an average particle diameter of 220 to 300 nm at a content proportion of 1.0 to 15 mass ppm with respect to the total mass of the mixture.

As the light diffusing agent, it is possible to use known fine particles such as titanium dioxide, aluminum oxide, zinc oxide, zinc sulfide, and barium sulfate. In a case where the transparent resin is a methacrylic-based resin, titanium dioxide, aluminum oxide, zinc oxide, and zinc sulfide are preferable, and titanium dioxide is more preferable. In particular, for an application in a lamp cover having a curved surface shape, titanium dioxide particles having an average particle diameter of 150 to 500 nm are preferable, and titanium dioxide particles having an average particle diameter of 220 to 300 nm are more preferable. Even in a lamp cover having a curved surface shape, incident light is not significantly emitted at the curved surface portion, thus, it is possible to make the transparency, the brightness, the low coloring property, and the balance between transparency and brightness favorable.

From the viewpoint that the transparency and the brightness of the resin molded body are more favorably balanced, for the particle diameter distribution of the light diffusing agent of the present invention, in a cumulative frequency distribution curve of the particle diameter of the light diffusing agent, the ratio ($D_{90}/D_{10}$) of the particle diameter ($D_{90}$) having a cumulative frequency of 90% and the particle diameter ($D_{10}$) having a cumulative frequency of 10% is preferably 1.2 or more and 2.5 or less, more preferably 1.5 or more and 2.3 or less, and even more preferably 1.7 or more and 2.1 or less. A description will be given below of a method for obtaining the cumulative frequency distribution curve of the particle diameter of the light diffusing agent.

The closer $D_{90}/D_{10}$ is to 1, the sharper the particle diameter distribution of the light diffusing agent is, thus, the light diffusing efficiency of the resin molded body tends to be higher, for this reason, conversely, from the viewpoint of the tendency of the balance between the transparency and brightness of the resin molded body to decrease, the lower limit of $D_{90}/D_{10}$ is preferably 1.2 or more. The lower limit is more preferably 1.5 or more, and even more preferably 1.7 or more.

For the upper limit of $D_{90}/D_{10}$, when $D_{10}$ decreases and $D_{90}/D_{10}$ increases, the balance between the transparency and brightness of the obtained resin molded body tends to decrease, and, conversely, when $D_{90}$ increases and $D_{90}/D_{10}$ increases, the light diffusion efficiency tends to deteriorate, and, from the viewpoint that the brightness of the obtained resin molded body tends to decrease, 2.5 or less is preferable. The upper limit is more preferably 2.3 or less, and even more preferably 2.1 or less.

Here, $D_{90}/D_{10}$ is 2.5 or less, more preferably 2.3 or less, and a resin molded body including a transparent resin composition containing the light diffusing agent in which the average particle diameter is in a range of 220 nm or more and 300 nm or less as more than 4.0 mass ppm and less than 20 mass ppm with respect to the total mass of the transparent resin composition, more preferably 6.5 mass ppm or more and 18 mass ppm or less, and even more preferably 7.2 mass ppm or more and 16 mass ppm or less, has a particularly excellent transparency, brightness, low coloring property, and balance between transparency and brightness.

As the light diffusing agent, it is possible to use known fine particles such as titanium dioxide, aluminum oxide, zinc oxide, zinc sulfide, and barium sulfate. In a case where the transparent resin is a methacrylic-based resin, from the viewpoint of excellent transparency and brightness, titanium dioxide, aluminum oxide, zinc oxide, and zinc sulfide are preferable, and titanium dioxide is more preferable.

<Method for Manufacturing Transparent Resin Composition>

The transparent resin composition of the present invention is produced by mixing a mixture including the transparent resin and the light diffusing agent. The mixing method is not particularly limited and a melt kneading method, a solvent kneading method, a dry blending method or the like may be used, and the melt kneading method and the dry blending method are preferably used from the viewpoint of productivity. As the equipment used for mixing, it is possible to use a normal mixer, a kneader, or the like, and specific examples thereof include a single-shaft kneading extruder, a twin-shaft kneading extruder, a ribbon blender, a Henschel mixer, a Banbury mixer, a drum tumbler, or the like.

In the transparent resin composition of the present invention, since it is possible to uniformly disperse the light diffusing agent without aggregation in the transparent resin composition by using a twin-shaft kneading extruder, the obtained resin molded body has transparency, brightness, a low coloring property, and an excellent balance between transparency and brightness. Specifically, using a twin-shaft kneading extruder, it is possible to obtain a pellet-shaped transparent resin composition by melting and mixing a mixture including the transparent resin and the light diffusing agent in a temperature range of the transparent resin inciting point or higher and the melting point +100° C. or lower.

Using a twin-shaft kneading extruder, It is possible to suppress deterioration and coloring of the mixture due to heating by setting the temperature at the time of melting and mixing the mixture including the transparent resin and the light diffusing agent in a temperature range of the transparent resin melting point or higher and the melting point +100° C. or lower, thus, the obtained resin molded body has an excellent low coloring property.

The transparent resin composition used in the present invention may contain various additives as necessary in a range in which the effects of the present invention are not impaired, for example, known additives such as antioxidants, stabilizers, ultraviolet absorbers, lubricants, processing aids, antistatic agents, colorants, impact resistance aids, foaming agents, fillers, and matting agents.

<Resin Molded Body>

A description will be given below of a resin molded body including the transparent resin composition according to the second embodiment.

One embodiment of the resin molded body which is the second embodiment of the present invention is a resin molded body obtained by molding a resin composition including the transparent resin composition of the present invention. That is, the resin molded body of the present invention is a resin molded body including the transparent resin composition of the present invention. The shape of the resin molded body may be a flat plate shape or a plate shape having a concave curved surface or a convex curved surface.

In addition, another embodiment of the resin molded body which is the second embodiment of the present invention includes a transparent resin composition containing the transparent resin and the light diffusing agent which has an average particle diameter of 220 nm or more and 300 nm or less described above, in which, when evaluating the transparent resin composition as a molded body with a flat plate shape or a plate-shape having a concave curved surface or a convex curved surface, the total light transmittance (Tt) (abbreviated below as "total light transmittance") measured according to ISO13468 in the thickness direction when the optical path length of the transmitted light is 4 mm is 75% or more and less than 91%, the haze value (H) (abbreviated below as "haze value") measured according to ISO14782 in the thickness direction when the optical path length of the transmitted light is 4 mm is 1.0% or more and 14.5% or less, and the yellowness index (YI) (abbreviated below as "yellowness index") as measured according to ISO17223 in the thickness direction when the optical path length of the transmitted light is 4 mm, the total light transmittance (Tt), and the haze value (H) satisfy Expression (1) and Expression (2).

$$0.04 \leq H/Tt \leq 0.18 \quad (1)$$

$$0.10 \leq YI/H \leq 0.28 \quad (2)$$

Alternatively, another embodiment of the resin molded body which is the second embodiment of the present invention is a resin molded body including a transparent resin composition containing a transparent resin and a light diffusing agent which has an average particle diameter of 220 nm or more and 300 nm or less, in which the total light transmittance (Tt) measured according to ISO13468 in the thickness direction is 75% or more and less than 91%, the haze value (H) measured according to ISO14782 in the thickness direction is 1.0% or more and 14.5% or less, and, when the resin molded body guides light in the length direction of the resin molded body while scattering light in the thickness direction of the resin molded body, the brightness attenuation coefficient ($m^{-1}$) is 10 or more and 30 or less, and the brightness retention coefficient ($m^{-1}/\%$) obtained by dividing the brightness attenuation coefficient by the haze value (%) of the resin molded body is 1.5 or more and 3.5 or less.

In this specification, the thickness direction of the resin molded body refers to a direction substantially orthogonal to the surface of the resin molded body.

The total light transmittance (Tt) in the thickness direction when the optical path length of the transmitted light is 4 mm does not limit the thickness of the resin molded body to 4 mm, but is a value defined when the total light transmittance is measured when the optical path length of the transmitted light is 4 mm.

The haze value (H) in the thickness direction when the optical path length of the transmitted light is 4 mm does not limit the thickness of the resin molded body to 4 mm, but is a value defined when the haze value (H) is measured when the optical path length of the transmitted light is 4 mm.

The yellowness index (YI) in the thickness direction when the optical path length of the transmitted light is 4 mm does not limit the thickness of the resin molded body to 4 mm, but the yellowness index (YI) is a value defined when the yellowness index (YI) is measured when the optical path length of the transmitted light is 4 mm.

Here, in a case where the thickness of the resin molded body is not 4 mm, the total light transmittance per 4 mm thickness is determined based on the measured total light transmittance (Tt). The same applies to the haze value (H) and the yellowness index (YI).

Regarding the lower limit of the total light transmittance of the resin molded body of the present invention, when the resin molded body has high transparency when a light source is turned off, the presence of the resin molded body is low, thus, from the viewpoint of the design property of the lamp, the vehicle, or the like being excellent, the lower limit is 75% or more, more preferably 78% or more, and even more preferably 80% or more. The upper limit of the total light transmittance of the resin molded body is not particularly limited, but, from the viewpoint that the resin molded body has an excellent light diffusing property and high brightness, the upper limit is less than 91%, more preferably 87% or less, and even more preferably 85% or less. It is possible to arbitrarily combine the upper limits and lower limits described above. Specifically, the total light transmittance of the resin molded body is preferably 75% or more and less than 91, more preferably 78 to 87%, and even more preferably 80 to 85%.

It is possible to control the total light transmittance of the resin molded body of the present invention by adjusting the type of the transparent resin, the type of the light diffusing agent, the shape and the content proportion, and the conditions of the manufacturing method in the transparent resin composition.

From the viewpoint that the resin molded body has an excellent light diffusing property and high brightness, the lower limit of the haze value of the resin molded body of the present invention is 1.0% or more, and more preferably 6.0% or more. From the viewpoint that when a light source is turned on, the brightness is favorable, and that, when a light source is turned off, the resin molded body has transparency and it is possible to lower the presence of the resin molded body, such that the design property is excellent, the upper limit of the haze value of the resin molded body is 14.5% or less, and more preferably 13.0% or less. It is possible to arbitrarily combine the upper limits and lower limits described above. Specifically, the haze value of the resin molded body is preferably 1.0 to 14.5%, and more preferably 6.0 to 13.0%.

It is possible to control the haze value of the resin molded body of the present invention by adjusting the type of the transparent resin, the type of the light diffusing agent, the shape and the content proportion, and the conditions of the manufacturing method in the transparent resin composition.

In one embodiment of the resin molded body which is the second embodiment of the present invention, a value (H/Tt value) obtained by dividing the haze value (H) by the total light transmittance (Tt) is an index of the transparency and the brightness of the resin molded body and satisfies Expression (1). In addition, the value (YI/H value) obtained by dividing the yellowness index (YI) by the haze value (H) is an index of the uniformity of brightness and the uniformity of hue of the resin molded body, and satisfies Expression (2).

$$0.04 \leq H/Tt \leq 0.18 \quad (1)$$

$$0.10 \leq YI/H \leq 0.28 \quad (2)$$

From the viewpoint that the light diffusing property is high and the brightness of the resin molded body is favorable when a light source is turned on, the lower limit of the H/Tt value is 0.04 or more, more preferably 0.06 or more, and even more preferably 0.08 or more. On the other hand, from the viewpoint of making the transparency of the resin molded body favorable, the upper limit of the H/Tt value is 0.18 or less, and more preferably 0.14 or less. It is possible to arbitrarily combine the upper limits and lower limits described above. Specifically, the H/Tt value is preferably 0.04 to 0.18, more preferably 0.06 to 0.14, and even more preferably 0.08 to 0.14.

It is possible to control the H/Tt value of the resin molded body of the present invention by adjusting the type of the transparent resin, the type of the light diffusing agent, the shape and the content proportion, and the conditions of the manufacturing method in the transparent resin composition.

From the viewpoint that it is possible to suppress the resin molded body from having a bluish tint when a light source is turned on and that the low coloring property and the transparency are favorable, the lower limit of the YI/H value is 0.10 or more and more preferably 0.12 or more. On the other hand, from the viewpoint of maintaining the light diffusion property to make the brightness favorable, the upper limit of the YI/H value is 0.28 or less, and more preferably 0.24 or less. It is possible to arbitrarily combine the upper limits and lower limits described above. Specifically, the YI/H value is preferably 0.10 to 0.28, and more preferably 0.12 to 0.24.

It is possible to control the YI/H value of the resin molded body of the present invention by adjusting the type of the transparent resin, the type of the light diffusing agent, the shape and the content proportion, and the conditions of the manufacturing method in the transparent resin composition.

In another embodiment of the resin molded body which is the second embodiment of the present invention, when the resin molded body guides light in the length direction of the resin molded body while scattering light in the thickness direction of the resin molded body, the brightness attenuation coefficient (unit: $m^{-1}$) is 10 or more and 30 or less, and the brightness retention coefficient (unit: $m^{-1}$/%) is 1.5 or more and 3.5 or less.

The brightness attenuation coefficient is one index related to the brightness of the resin molded body, and is a gradient when plotting the logarithm of the brightness value (unit: cd) of the light emitted in the direction perpendicular the main plane contacting the end surface and the distance (unit: m) from the end surface when the light is incident from the end surface from the light source arranged on the one end surface of the sheet-shaped resin molded body. A larger value of the brightness attenuation coefficient represents that more light is extracted per unit length in the light guide direction.

The smaller the value of the brightness attenuation coefficient is, the longer the light guiding distance of the resin molded body is, but the brightness becomes insufficient, thus, the lower limit of the brightness retention coefficient is 10 or more, and more preferably 15 or more. On the other hand, the larger the value of the brightness attenuation coefficient is, the more the brightness of the resin molded body is improved, but the light guiding distance is shortened, thus, the upper limit of the brightness retention coefficient is 30 or less, and more preferably 25 or less. It is possible to arbitrarily combine the upper limits and lower limits described above.

Alternatively, the brightness attenuation coefficient is preferably 10 or more and 30 or less, and more preferably 15 or more and 25 or less.

The brightness retention coefficient is one index related to the balance between transparency and brightness of the resin molded body and is an index which defines an excellent transparency when a light source is turned on, while realizing a high brightness when a light source is turned off.

The brightness retention coefficient is a value obtained by dividing the brightness attenuation coefficient by the haze value (%) of the resin molded body measured when the optical path length of the transmitted light is 4 mm. Setting the value of the brightness retention coefficient to fall within the optimum numerical range makes it possible to favorably balance the transparency and brightness of the resin molded body of the present invention.

The smaller the value of the brightness retention coefficient is, the more the transparency of the resin molded body is improved and the longer the light guiding distance becomes, but the brightness becomes insufficient, thus, the lower limit of the brightness retention coefficient is 1.5 or more, and more preferably 2.0 or more. On the other hand, the larger the value of the brightness retention coefficient is, the more the brightness of the resin molded body is improved, but the transparency is insufficient and the light guiding distance is shortened, thus, the upper limit of the brightness retention coefficient is 3.5 or less and more preferably 2.5 or less. It is possible to arbitrarily combine the upper limits and lower limits described above.

Alternatively, the brightness retention coefficient is preferably 1.5 or more and 3.5 or less, and more preferably 2.0 or more and 2.5 or less.

In addition, it is necessary to pay attention to the following points when measuring the brightness attenuation coefficient.

1. A material having a light-shielding property, such as black paper or cloth, which does not easily reflect light is arranged on the back surface of a test piece of the resin molded body. This is to remove the light emitted to the back surface side and to eliminate the influence of disturbances such as stray light to improve the accuracy of analysis.

2. In the vicinity of the end surface facing the incident surface, the measured value of the brightness may be influenced by the reflection of light from the end surface, thus, the end surface facing the incident surface is subjected to an absorption treatment. Specific examples of a method of the absorption treatment include a method of applying black ink to, or bringing a black paper in close contact with, the end surface facing the incident surface.

3. In the vicinity of the incident end surface, it may not be possible to linearly approximate the relationship between the logarithm of the brightness value (unit: cd) of emitted light and the distance (unit: m) from the end surface, thus, that portion is excluded when the brightness attenuation coefficient is derived.

In addition, in the resin molded body which is the second embodiment of the present invention, from the viewpoint of the resin molded body having an excellent transparency, brightness, and balance between transparency and brightness, the lower limit of the content proportion of the light diffusing agent of the transparent resin composition is preferably 4.0 mass ppm or more with respect to the total mass of the transparent resin composition, more preferably 6.5 mass ppm or more, and even more preferably 7.2 mass ppm or more. From the viewpoint of the resin molded body having an excellent transparency, brightness, and balance between the transparency and the brightness, the upper limit of the added amount of the light diffusing agent is preferably 20 mass ppm or less with respect to the total mass of the transparent resin composition, more preferably 18 mass ppm or less, and even more preferably 16 mass ppm or less. It is possible to arbitrarily combine the upper limits and lower limits described above.

Alternatively, in the resin molded body of the present invention, the content proportion of the light diffusing agent of the transparent resin composition is preferably more than 4.0 mass ppm and less than 20 mass ppm with respect to the total mass of the transparent resin composition, more preferably 6.5 mass ppm or more and 18 mass ppm or less, and even more preferably 7.2 mass ppm or more and 16 mass ppm or less.

In a more preferable embodiment of the resin molded body which is the second embodiment of the present invention, from the viewpoint of the resin molded body having an excellent transparency, brightness, low coloring property, and balance between transparency and brightness, the light diffusing agent which has an average particle diameter of 220 to 300 nm is preferably included at a content proportion of more than 4 mass ppm and less than 20 mass ppm.

In an even more preferable embodiment of the resin molded body which is the second embodiment of the present invention, from the viewpoint of a resin molded body having a curved surface shape having a superior transparency, brightness, low coloring property, and balance between transparency and brightness, the light diffusing agent which has an average particle diameter of 220 to 300 nm is more preferably included in a content proportion of 6.5 mass ppm or more and 18 mass ppm or less, and even more preferably included in a content proportion of 7.2 mass ppm or more and 16 mass ppm or less.

These resin molded bodies according to the second embodiment of the present invention are molded bodies with a flat plate shape or a plate-shape having a concave curved surface or a convex curved surface, and when a region of at least a part of the side end surface of the resin molded body is a light incidence end surface, at least one main surface of the resin molded body is a light emission surface, and the output of the LED light source is adjusted such that the maximum value of the brightness of the light emitted from the light emission surface is 2200 $cd/m^2$ or less, if the in-plane average brightness, which is the average value of the brightness on the light emission surface, is 500 $cd/m^2$ or more, the generation of brightness unevenness is suppressed, which is preferable. 1000 $cd/m^2$ or more is more preferable.

In order to make the in-plane average brightness 500 $cd/m^2$ or more, it is possible to carry out adjustments by the type of the light diffusing agent, the average particle diameter of the light diffusing agent, the content proportion of the light diffusing agent, the type of the transparent resin, and the refractive index difference between the transparent resin and the light diffusing agent, as described above. A description will be given of the method for measuring the in-plane average brightness.

In the resin molded body of the present invention, it is possible to use the light diffusing agent described in the section of the transparent resin composition as the light diffusing agent.

In the resin molded body of the present invention, it is possible to use the transparent resin described in the section of the transparent resin composition as the transparent resin. From the viewpoint of excellent heat resistance and impact resistance, a polycarbonate-based resin is preferable and, from the viewpoint of an excellent transparency, brightness, low coloring property and balance between transparency and brightness in a case where titanium dioxide is used, a methacrylic-based resin is preferable.

The lower limit of the thickness of the resin molded body according to the present invention is not particularly limited and is preferably 1 mm or more from the viewpoint of favorable mechanical characteristics in addition to the brightness of the resin molded body. The lower limit is more preferably 3 mm or more, and even more preferably 5 mm or more. On the other hand, the upper limit of the thickness of the resin molded body is not particularly limited and is preferably 20 mm or less from the viewpoint of favorable transparency of the resin molded body. 15 mm or less is more preferable, and 10 mm or less is even more preferable. Specifically, the thickness of the resin molded body is preferably 1 to 20 mm, more preferably 3 to 15 mm, and even more preferably 5 to 10 mm.

<Method for Manufacturing Resin Molded Body>

Examples of the method for obtaining the resin molded body of the present invention include known molding methods such as a known injection molding method, an extrusion molding method, and a pressure molding method. In addition, the obtained molded body may be subjected to secondary molding by using a known molding method such as a compressed air molding method or a vacuum molding method. Molding conditions such as the molding temperature and the molding pressure may be appropriately set.

Specifically, in a state where the pellet-shaped transparent resin composition obtained by the method for manufacturing a transparent resin composition described above is dried at 70 to 100° C. for 4 to 24 hours, and the water content of the transparent resin composition after drying is 0.1% or less with respect to the total mass of the transparent resin composition, it is possible to obtain the resin molded body of the present invention by molding using a known molding method such as a known injection molding method, an extrusion molding method, or a pressure molding method.

By drying at 70 to 100° C. for 4 to 24 hours, it is possible to suppress deterioration and coloring of the transparent resin composition due to heating, thus, the transparency and low coloring property of the resin molded body are excellent.

By performing injection molding in a state where the water content of the transparent resin composition is 0.1% or less with respect to the total mass of the transparent resin composition, the resin molded body after the injection molding is less likely to have a poor appearance such as silver streaks, and it is possible to obtain a resin molded body having excellent transparency and a favorable appearance.

<Vehicle Interior/Exterior Member, Lamp Cover for Illumination Lamp, Light Guide for Planar Light Source Device, and Vehicle>

The resin molded body of the present invention has an excellent transparency, brightness, low coloring property, and balance between transparency and brightness. Therefore, by arranging and using the light source in a region of at least a part of the side end surface of the resin molded body, the resin molded body of the present invention is excellent in visibility due to emitting high brightness when a light source is turned on and is excellent in the design property due to being transparent and having a low presence when a light source is turned off, thus, it is possible to suitably use the resin molded body for a vehicle interior/exterior member, a lamp cover for an illumination lamp, and a light guide for a planar light source device.

Figure 7:
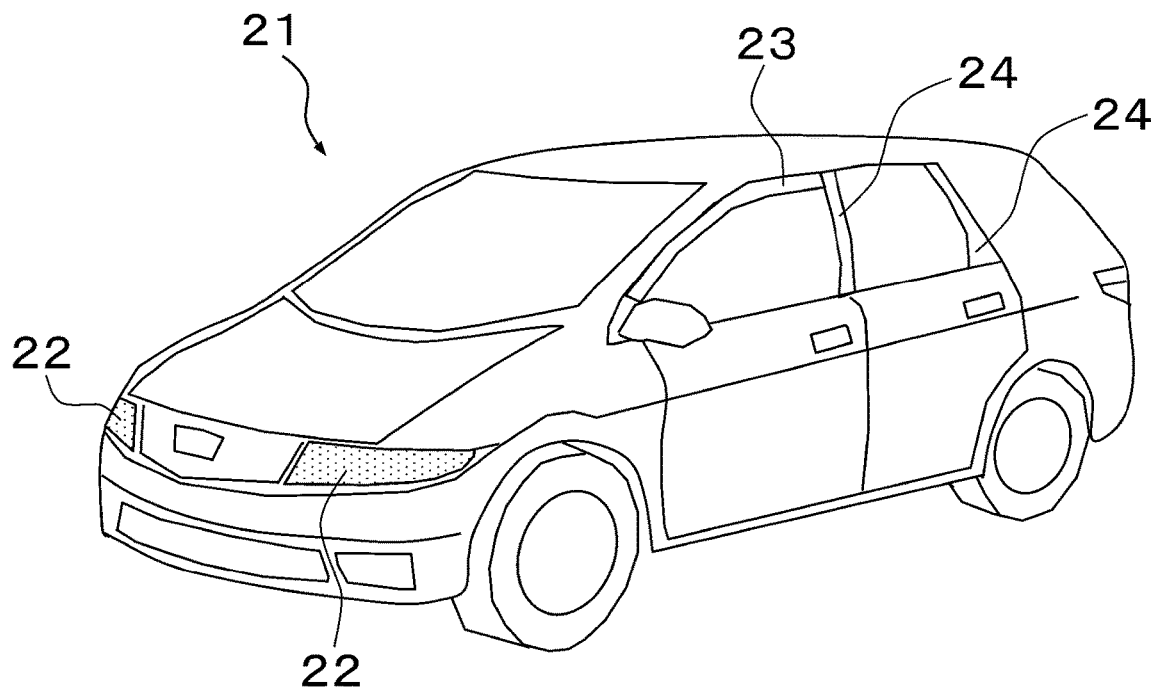
FIG. 7 is a schematic diagram showing a vehicle in which the resin molded body of the present invention is used for a vehicle lamp cover, a visor, and a pillar, which are vehicle exterior members.

Since it is possible to obtain uniform emitted light with the resin molded body of the present invention even at a large size having a curved surface shape, suitable use is possible as a vehicle exterior member, for example, a vehicle lamp cover 22, a visor 23, and a pillar 24 shown in FIG. 7 (simply referred to below as "vehicle exterior members"). In the vehicle 21 shown in FIG. 7, light from an LED light source not shown in FIG. 7 is incident from a side end portion of the vehicle exterior member to cause the vehicle exterior member to function as a surface light emitter and make it possible to impart a novel design to the vehicle 21.

Figure 10:
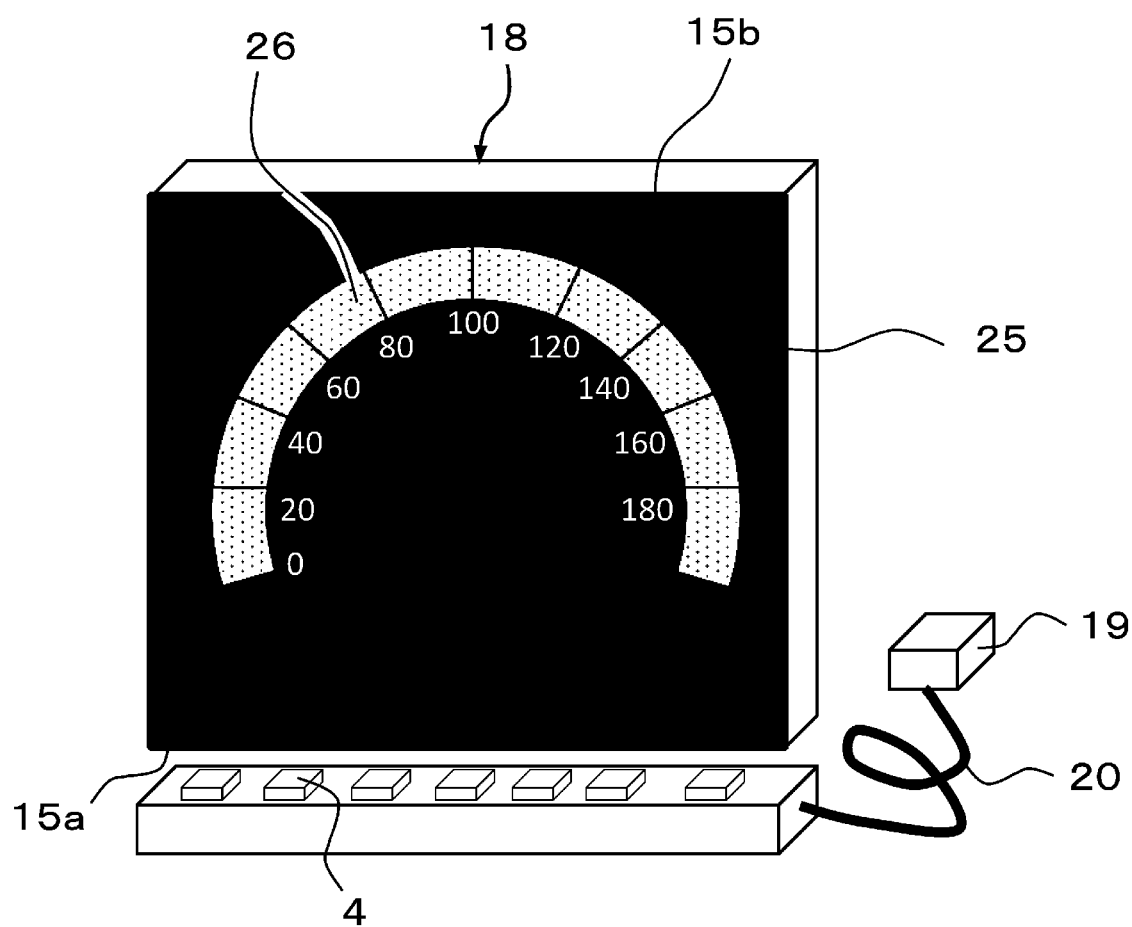
FIG. 10 is a schematic diagram showing an example in which the resin molded body of the present invention is used for a meter panel which is a vehicle interior member.

It is possible to suitably use the resin molded body of the present invention as a vehicle interior member, for example, in the meter panel shown in FIG. 10. In the meter panel of FIG. 10, a light-shielding member (black cutting sheet) 25 in which a light-transmitting portion 26 such as a number or a symbol is formed is installed on the surface (a light emission surface 15b) of a resin molded body 18, light of an LED light source 4 connected by a power cord 20 to a power supply unit 19 is incident from the light incidence end surface 15a of the resin molded body 18, and the numbers, symbols, and the like of the light transmitting portion 26 are made to stand out, making it possible to impart a novel design to the vehicle interior member.

It is possible to suitably use the resin molded body of the present invention as a vehicle exterior member, for example, in the combination lamp cover shown in FIG. 3, as described below. The resin molded body is particularly suitable for a vehicle lamp cover.

Figure 8:
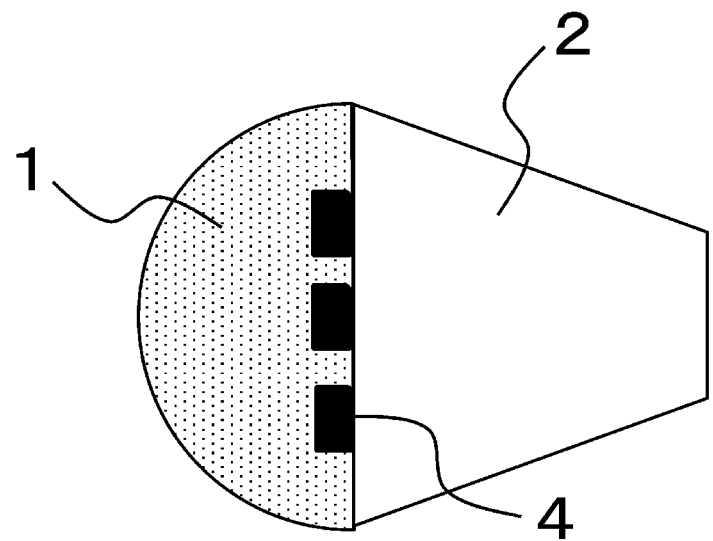
FIG. 8 is a schematic diagram showing an example of an illumination lamp in which the resin molded body of the present invention is used for a lamp cover for an illumination lamp.

It is possible to suitably use the resin molded body of the present invention, for example, as a lamp cover for an illumination lamp shown in FIG. 8. FIG. 8 is a schematic diagram showing an example of an illumination lamp using the resin molded body of the present invention. In FIG. 8, an LED light source is used as the light source. A lamp cover 1 of FIG. 8 has a structure arranged in front of the LED light source 4 fixed on a support substrate which is not shown so as to protect the LED light source 4 as a lamp cover for an illumination lamp.

Figure 9:
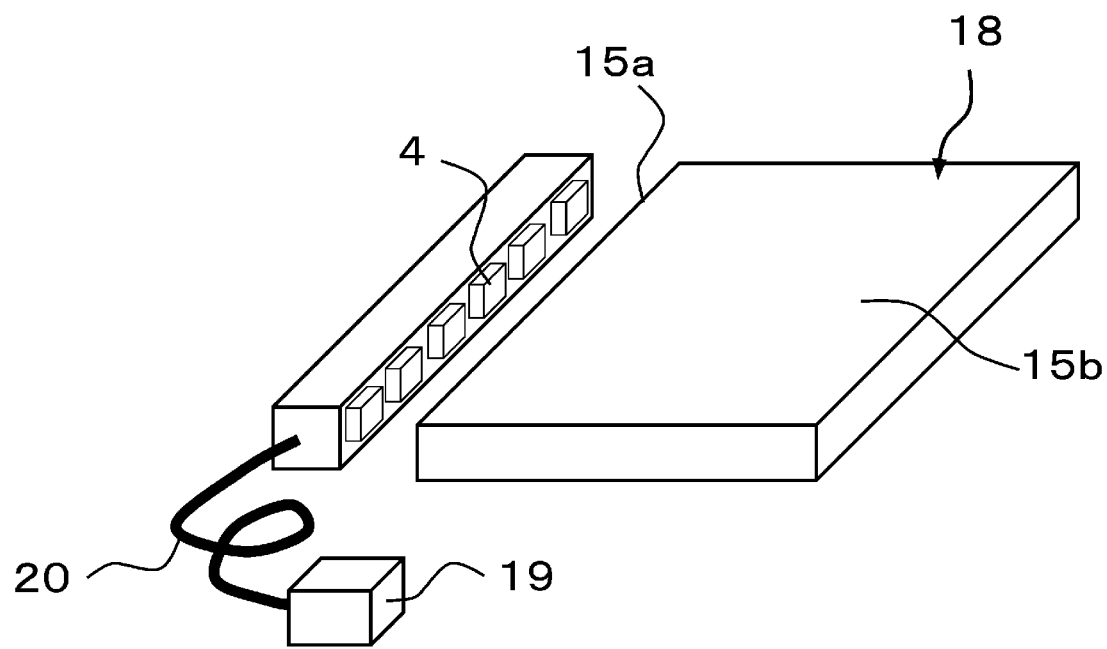
FIG. 9 is a schematic diagram showing an example in which the resin molded body of the present invention is used in a planar light source device.

It is possible to suitably use the resin molded body of the present invention, for example, in the planar light source device shown in FIG. 9. FIG. 9 is a schematic diagram showing an example of a planar light source device using the resin molded body of the present invention. In FIG. 9, an LED light source is used as the light source. In the planar light source device of FIG. 9, the light of the LED light source 4 connected to the light source unit 19 by the power cord 20 is incident from the light incidence end surface 15a of the resin molded body 18 makes emission possible from the light emission surface 15b, thus, the device has a function as a surface light emitter.

<Vehicle Lamp Cover, Combination Lamp Cover, and Vehicle>

A description will be given of a vehicle lamp cover which is the third embodiment of the present invention, a combination lamp cover which is the fourth embodiment, and a vehicle which is the fifth embodiment.

The vehicle lamp cover which is the third embodiment of the present invention is a vehicle lamp cover including the resin molded body of the second embodiment.

Since the vehicle lamp cover includes the resin molded body, the vehicle lamp cover has an excellent transparency, brightness, low coloring property, and balance between transparency and brightness.

Examples of specific embodiments of the combination lamp cover which is the fourth embodiment of the present invention include a combination lamp cover having a transparent or semi-transparent headlamp cover or a rear lamp cover which does not substantially include a light diffusing agent, and a vehicle lamp cover of the present invention, in which the vehicle lamp cover is arranged in an outer edge, or a region of at least a part of the outer edge, of the headlamp cover or the rear lamp cover.

"Does not substantially include" means that the content proportion of the light diffusing agent is less than 0.05 mass ppm with respect to the total mass of the transparent or semi-transparent headlamp cover or rear lamp cover.

The combination lamp is manufactured by injection molding a plurality of components, preferably two components, at which time, only one component forming the vehicle lamp cover contains a light diffusing agent, and the other component forming the transparent or semi-transparent headlamp cover or the rear lamp cover contains substantially no light diffusing agent. Specifically, as the other component, it is possible to use the components other than the light diffusing agent in the components described in the above <Transparent Resin Composition>. In this manner, it is possible to manufacture a lamp cover in which the component containing the light diffusing agent exhibits a specific shape or pattern. By arranging and using the light source in a region of at least a part of the side end surface of the vehicle lamp cover of the combination lamp cover, when a light source is off, that is, in a state where no light is incident, the vehicle lamp cover appears as a uniform transparent molded body, is transparent, and has a low presence, and thus has an excellent design property. However, since high brightness is emitted when a light source is turned on, only the portion of the lamp cover containing the light diffusing agent emits light, thus, the visibility is excellent.

A vehicle provided with the vehicle lamp cover or the combination lamp cover of the present invention has an excellent design property and vehicle lamp cover visibility.

A vehicle provided with the vehicle lamp cover or the combination lamp cover of the present invention has an excellent design property and lamp cover visibility.

<Lamp Cover>

A description will be given of a lamp cover which is a sixth embodiment of the present invention.

The lamp cover of the present invention is used for vehicle member applications and lighting applications and has a curved surface shape in at least a part of the lamp cover. The lamp (also referred to below as "light source") is not particularly limited and examples thereof include a light emitting diode such as an LED light source, an incandescent light bulb, a halogen light bulb, a fluorescent lamp, a semiconductor laser, or the like.

FIG. 1 is a schematic cross-sectional view showing an example of a lamp using the lamp cover of the present invention. FIG. 1 is an example of a headlamp cover using an LED light source as a light source and the lamp cover 1 protects a vehicle headlight and diffuses the light of the LED light source with high brightness to emit light. The lamp cover 1 of FIG. 1 has a structure in which the lamp cover 1 is arranged in front of a projection lens 3 so as to protect the projection lens 3 arranged in front of the LED light source 4 fixed on a support substrate 5, and in which a lamp chamber is formed by the lamp cover 1 and a housing 2.

Figure 2:
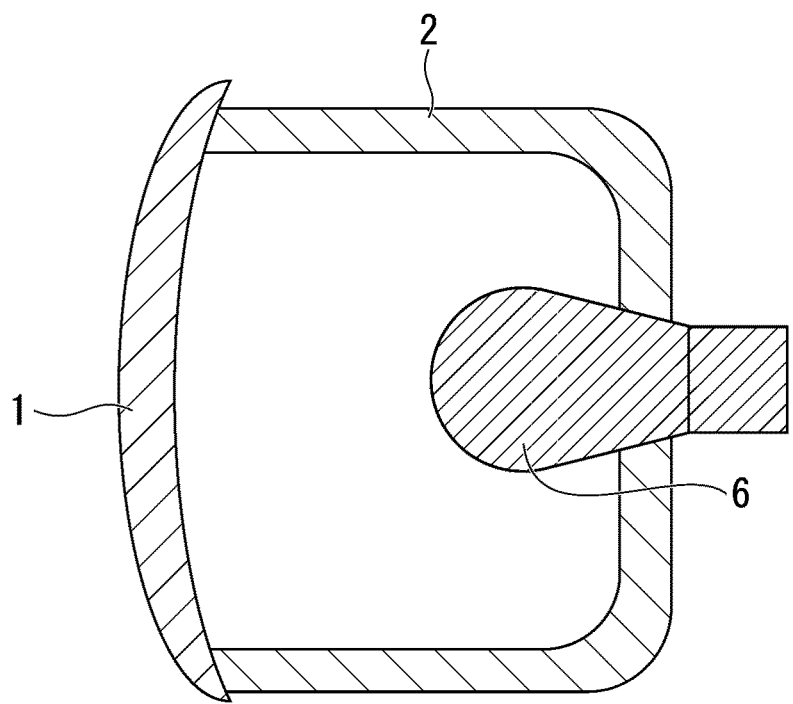
FIG. 2 is a schematic cross-sectional diagram showing another example of a lamp using the lamp cover of the present invention.

FIG. 2 is a schematic cross-sectional view showing another example of a lamp using the lamp cover of the present invention. FIG. 2 is an example of a headlamp cover using a halogen lamp 6 as a light source and the lamp cover 1 protects a vehicle headlight and diffuses the light of the halogen lamp with high brightness to emit light. A rear lamp cover 2 in FIG. 2 has a structure in which the lamp cover 1 is arranged in front of the halogen lamp 6 so as to protect the halogen lamp 6 and in which a lamp chamber is formed by the lamp cover 1 and the housing 2. As shown in FIG. 2, the lamp cover 1 of the present invention is preferably curved so as to protrude to the side opposite to the light source.

It is possible to form the lamp cover of the present invention of a transparent resin composition including a transparent resin described below and a light diffusing agent described below.

One embodiment of a lamp cover which is a sixth embodiment of the present invention is a lamp cover in which a total light transmittance (Tt) (abbreviated below as the "total light transmittance") measured according to ISO13468 in the thickness direction when the optical path length of the transmitted light is 4 mm is 75% or more, the haze value (H) (abbreviated below as the "haze value") measured according to ISO14782 in the thickness direction when the optical path length of the transmitted light is 4 mm is 1.0% or more and 14.5% or less, the yellowness index (YI) (abbreviated below as "yellowness") measured according to ISO17223 in the thickness direction when the optical path length of transmitted light is 4 mm is 2.1 or less, and H/Tt and YI/H satisfy Expression (1) and Expression (2).

$$0.04 \leq H/Tt \leq 0.18 \quad (1)$$

$$0.10 \leq YI/H \leq 0.28 \quad (2)$$

Alternatively, another embodiment of the lamp cover according to the sixth embodiment of the present invention is a lamp cover in which the total light transmittance (Tt) measured according to ISO13468 in the thickness direction is 75% or more and less than 91%, the haze value (H) measured according to ISO14782 in the thickness direction is 1.0% or more and 14.5% or less, the yellowness index (YI) measured according to ISO17223 in the thickness direction is 7.0 or less, and, a brightness retention coefficient ($m^{-1}$/%) obtained by dividing a brightness attenuation coefficient ($m^{-1}$) when the lamp cover guides light in a length direction of the lamp cover while scattering light in the thickness direction of the lamp cover, by a haze value (%) of the lamp cover is 1.5 or more and 3.5 or less.

In the present specification, the thickness direction of the lamp cover refers to a direction substantially orthogonal to the surface of the lamp cover.

The total light transmittance (Tt) in the thickness direction when the optical path length of the transmitted light is 4 mm does not limit the thickness of the lamp cover to 4 mm, but defines a value when the total light transmittance is measured when the optical path length of the transmitted light is 4 mm.

The haze value (H) in the thickness direction when the optical path length of transmitted light is 4 mm does not limit the thickness of the lamp cover to 4 mm, but defines a value when the haze value (H) is measured when the optical path length of the transmitted light is 4 mm.

The yellowness index (YI) in the thickness direction when the optical path length of the transmitted light is 4 mm does not limit the thickness of the lamp cover to 4 mm, but defines the yellowness index (YI) when the yellowness index (YI) is measured when the optical path length of transmitted light is 4 mm.

From the viewpoint that, when the transparency of the lamp cover is high when a light source is off, the presence of the lamp cover is low, thus, the design property of the lamp, vehicle, or the like, is excellent, the lower limit of the total light transmittance of the lamp cover of the present invention is 75% or more, preferably 80% or more, and more preferably 85% or more. From the viewpoint that the lamp cover has an excellent light diffusing property and high brightness, the upper limit of the total light transmittance of the lamp cover is less than 91%, and more preferably 87% or less. It is possible to arbitrarily combine the upper limits and lower limits described above. Specifically, the total light transmittance of the lamp cover is preferably 75% or more and less than 91%, more preferably 80 to 87%, and even more preferably 85 to 87%.

The total light transmittance (Tt) of the lamp cover of the present invention is achieved by optimizing the type of the transparent resin, the type, the shape, and the content of the light diffusing agent, and the conditions of the manufacturing method in the transparent resin composition.

From the viewpoint that the lamp cover has an excellent light diffusing property and high brightness, the lower limit of the haze value (H) of the lamp cover of the present invention is 1.0% or more, and more preferably 6.0% or more. From the viewpoint that the brightness when a light source is turned on is favorable, and the lamp cover has a transparency and it is possible to lower the presence of the lamp cover when the light source is turned off, such that the design property of the lamp, vehicle, or the like is excellent, the upper limit of the haze value of the lamp cover is 14.5% or less, and more preferably 13.0% or less. It is possible to arbitrarily combine the upper limits and lower limits described above. Specifically, the haze value of the lamp cover is preferably 1.0 to 14.5%, and more preferably 6.0 to 13.0%.

The haze value of the lamp cover of the present invention is achieved by optimizing the type of the transparent resin, the type, the shape, and the content of the light diffusing agent, and the conditions of the manufacturing method in the transparent resin composition.

From the viewpoint of being able to suppress the lamp cover from having a bluish tint when a light source is turned on and that the low coloring property is favorable, or the viewpoint that there is a transparent feeling in the lamp cover when the light source is off such that the presence of the lamp cover is low and the design property of the lamp, vehicle, or the like is excellent, the upper limit of the yellowness index (YI) of the lamp cover of the present invention is 7.0 or less, preferably 1.5 or less, and even more preferably 1.0 or less. The lower limit of the yellowness index of the lamp cover is not particularly limited and is preferably a small value.

The yellowness index of the lamp cover of the present invention is achieved by optimizing the type of the transparent resin, the type, the shape, and the content of the light diffusing agent, and the conditions of the manufacturing method in the transparent resin composition.

In an embodiment of the lamp cover which is the sixth embodiment of the present invention, a value (H/Tt value) obtained by dividing the haze value (H) by the total light transmittance (Tt) is an index of the transparency and brightness of the lamp cover and satisfies Expression (3). In addition, a value (YI/H value) obtained by dividing the yellowness index (YI) by the haze value (H) is an index of the brightness and hue of the lamp cover and satisfies Expression (4).

$$0.01 \leq H/Tt \leq 0.2 \quad (3)$$

$$-1.0 \leq YI/H \leq 1.0 \quad (4)$$

From the viewpoint that the light diffusing property is high and the brightness of the lamp cover is favorable when a light source is turned on, the lower limit of the H/Tt value is 0.01 or more, more preferably 0.02 or more, and even more preferably 0.04 or more. On the other hand, from the viewpoint of making the transparency of the lamp cover favorable, the upper limit of the H/Tt value is 0.2 or less, and more preferably 0.18 or less. It is possible to arbitrarily combine the upper limits and lower limits described above. Specifically, the H/Tt value is preferably 0.01 to 0.2, and more preferably 0.02 to 0.18.

The H/Tt value of the lamp cover of the present invention is achieved by optimizing the type of the transparent resin, the type, the shape, and the content of the light diffusing agent, and the conditions of the manufacturing method in the transparent resin composition.

From the viewpoint of being able to suppress the lamp cover from having a bluish tint when a light source is turned on and that the low coloring property and the transparency are favorable, the lower limit of the YI/H value is −1.0 or more and more preferably 0.1 or more. On the other hand, from the viewpoint of maintaining the light diffusion property and making the brightness favorable, the upper limit of the YI/H value is 1.0 or less, and more preferably 0.6 or less. It is possible to arbitrarily combine the upper limits and lower limits described above. Specifically, the YI/H value is preferably −1.0 to 1.0, and more preferably 0.1 to 0.6.

The YI/H value of the lamp cover of the present invention is achieved by optimizing the type of the transparent resin, the type, the shape, and the content of the light diffusing agent, and the conditions of the manufacturing method in the transparent resin composition.

In another embodiment of the lamp cover which is the sixth embodiment of the present invention, when the lamp cover guides light in the length direction of the lamp cover while the lamp cover scatters light in the thickness direction of the resin molded body, the brightness attenuation coefficient (unit: $m^{-1}$) is 10 or more and 30 or less, and the brightness retention coefficient (unit: $m^{-1}/\%$) is 1.5 or more and 3.5 or less.

The smaller the value of the brightness attenuation coefficient is, the longer the light guiding distance of the lamp cover, but the brightness becomes insufficient, thus, the lower limit of the brightness retention coefficient is 10 or more, and more preferably 15 or more. On the other hand, the larger the value of the brightness attenuation coefficient, the more the brightness of the lamp cover is improved, but the light guiding distance is shortened, thus, the upper limit of the brightness retention coefficient is 30 or less, and more preferably 25 or less. It is possible to arbitrarily combine the upper limits and lower limits described above.

Alternatively, the brightness attenuation coefficient is preferably 10 or more and 30 or less, and more preferably 15 or more and 25 or less.

The smaller the value of the brightness retention coefficient is, the more the transparency of the lamp cover improves and the longer the light guiding distance becomes, but the brightness becomes insufficient, thus, the lower limit of the brightness retention coefficient is 1.5 or more, and more preferably 2.0 or more. On the other hand, the larger the value of the brightness retention coefficient is, the more the brightness of the lamp cover is improved, but the transparency is insufficient and the light guiding distance is shortened, thus, the upper limit of the brightness retention coefficient is 3.5 or less and more preferably 2.5 or less. It is possible to arbitrarily combine the upper limits and lower limits described above.

Alternatively, the brightness retention coefficient is preferably 1.5 or more and 3.5 or less, and more preferably 2.0 or more and 2.5 or less.

The lower limit of the length (thickness of the lamp cover) in the thickness direction of the lamp cover according to the present invention is not particularly limited, but is preferably 1 mm or more from the viewpoint of favorable mechanical characteristics in addition to the brightness of the lamp cover. The lower limit is more preferably 3 mm or more, and even more preferably 5 mm or more. On the other hand, the upper limit of the thickness of the lamp cover is not particularly limited, but is preferably 20 mm or less from the viewpoint of favorable transparency of the lamp cover. The upper limit is more preferably 15 mm or less, and even more preferably 10 mm or less. It is possible to arbitrarily combine the upper limits and lower limits described above. Specifically, the thickness of the lamp cover is preferably 1 to 20 mm, more preferably 3 to 15 mm, and even more preferably 5 to 10 mm.

The length of the lamp cover according to the present invention is not particularly limited and is usually 50 mm or more and 1000 mm or less in applications for vehicle members such as automobiles.

<Transparent Resin Composition>

The transparent resin composition is a raw material forming the lamp cover which is the sixth embodiment of the present invention.

The transparent resin composition is a resin composition including the transparent resin described above and the light diffusing agent described above.

By including the transparent resin described above in the transparent resin composition, the transparency of the lamp cover is excellent.

By including the light diffusing agent described above in the transparent resin composition, the lamp cover has an excellent transparency, brightness, low coloring property, and balance between the transparency and the brightness.

In addition, from the viewpoint of the lamp cover having an excellent transparency, brightness, and balance between transparency and brightness, the lower limit of the content of the light diffusing agent included in the transparent resin composition is preferably 0.05 mass ppm or more with respect to the total mass of the transparent resin composition, and more preferably 1.0 mass ppm or more. From the viewpoint of the lamp cover having an excellent transparency, brightness, and balance of transparency and brightness, the upper limit of the content of the light diffusing agent is preferably 20 mass ppm or less with respect to the total mass of the transparent resin composition, and more preferably 15 mass ppm or less. It is possible to arbitrarily combine the upper limits and lower limits described above. Specifically, the content of the light diffusing agent is preferably 0.05 to 20 mass ppm with respect to the total mass of the transparent resin composition, and more preferably 1.0 to 15 mass ppm.

In the transparent resin composition of the present invention, from the viewpoint of superior brightness of the lamp cover, the lower limit of the refractive index difference between the transparent resin and the light diffusing agent is preferably 0.3 or more, and more preferably 0.8 or more. From the viewpoint of the lamp cover having excellent transparency, the upper limit of the refractive index difference is preferably 3.0 or less, and more preferably 2.0 or less. It is possible to arbitrarily combine the upper limits and lower limits described above. Specifically, the refractive index difference between the transparent resin and the light diffusing agent is preferably 0.3 to 3.0, and more preferably 0.8 to 2.0.

<Method for Manufacturing Lamp Cover>

The lamp cover of the present invention may be obtained by using the transparent resin composition as a pellet-shaped molding material, which is filled (injected) in a molten state in a mold, then cooling and then separating the molded body from the mold.

Specifically, it is possible to obtain the lamp cover of the present invention by drying the pellet-shaped transparent resin composition obtained by the method for manufacturing a transparent resin composition described above at 70 to 100° C. for 4 to 24 hours and carrying out injection molding in a state where the water content of the transparent resin composition after drying is 0.1% or less with respect to the total mass of the transparent resin composition.

By drying at 70 to 100° C. for 4 to 24 hours, it is possible to suppress deterioration and coloring of the transparent resin composition due to heating, thus, the lamp cover has an excellent transparency and low coloring property.

By performing injection molding in a state where the water content of the transparent resin composition is 0.1% or less with respect to the total mass of the transparent resin composition, the lamp cover after the injection molding is less likely to have a poor appearance such as silver streaks and it is possible to obtain a lamp cover having excellent transparency and a favorable appearance.

As a method of injection molding, specifically, for example, it is possible to produce the lamp cover of the present invention by introducing a transparent resin composition in a state where the water content described above is 0.1% or less with respect to the total mass of the transparent resin composition from a hopper of an injection molding machine, moving back while rotating the shaft, measuring the resin composition in the cylinder, melting the resin composition, filling the molten resin composition in a mold while applying pressure, holding the pressure for a certain period of time until the mold is sufficiently cooled, then opening the mold and taking out the molded body. Various conditions when producing the lamp cover of the present invention (for example, the melting temperature of the molding material, the mold temperature at the time of injecting the molding material into the mold, the pressure when holding the pressure after filling the resin composition into the mold, and the like) may be appropriately set and are not particularly limited.

In addition, from the viewpoint of the lamp cover having an excellent transparency, brightness, and balance between transparency and brightness, the lower limit of the added amount of the light diffusing agent with respect to the transparent resin composition is 0.05 mass ppm or more with respect to the total mass of the transparent resin composition, and more preferably 1.0 mass ppm or more. From the viewpoint of the lamp cover having an excellent transparency, brightness, and balance between transparency and brightness, the upper limit of the added amount of the light diffusing agent is preferably 20 mass ppm or less with respect to the total mass of the transparent resin composition, and more preferably 15 mass ppm or less. It is possible to arbitrarily combine the upper limits and lower limits described above. Specifically, the added amount of the light diffusing agent is preferably 0.05 to 20 mass ppm with respect to the total mass of the transparent resin composition, and more preferably 1.0 to 15 mass ppm.

In a more preferable embodiment, from the viewpoint of the lamp cover having an excellent transparency, brightness, low coloring property, and balance between transparency and brightness, the mixture including the transparent resin and the light diffusing agent preferably includes a light diffusing agent which has an average particle diameter of 150 to 500 nm at a content proportion of 0.05 to 20 mass ppm. In an even more preferable embodiment, from the viewpoint of the lamp cover having a curved surface shape having a superior transparency, brightness, low coloring property, and balance between transparency and brightness, the mixture more preferably includes a light diffusing agent which has an average particle diameter of 220 to 300 nm at a content proportion of 1.0 to 15 mass ppm.

The light diffusing agent is preferably particles of titanium dioxide. Specific embodiments of the titanium dioxide particles are as described in the section of the lamp cover described above.

In addition to excellent transparency of the lamp cover, from the viewpoint of excellent mechanical properties, weather resistance, and workability, as the transparent resin, it is possible to use at least one type selected from a methacrylic-based resin, a polycarbonate-based resin, and a polystyrene-based resin. Specific embodiments of the methacrylic-based resin, the polycarbonate-based resin, and the polystyrene-based resin are as described in the section of the lamp cover described above.

<Combination Lamp Cover and Vehicle>

A description will be given of a combination lamp cover, which is the seventh embodiment of the present invention, and a vehicle, which is the eighth embodiment.

The form of the lamp cover of the present invention is not particularly limited, but it is possible to adopt a form having a light incidence end surface provided in a region of at least a part of the side end surface of the lamp cover and a light emission surface provided on at least one main surface of the lamp cover.

In the lamp cover, when the in-plane average brightness, which is the average value of the brightness on the light emission surface, is 500 cd/m$^2$ or more, the generation of brightness unevenness is suppressed, which is preferable. 1000 cd/m² or more is more preferable.

In order to make the in-plane average brightness 500 cd/m² or more, it is possible to carry out adjustments by the type of the light diffusing agent, the average particle diameter of the light diffusing agent, the content proportion of the light diffusing agent, the type of the transparent resin, and the refractive index difference between the transparent resin and the light diffusing agent, as described above.

The lamp cover of the present invention has an excellent transparency, brightness, low coloring property, and balance between transparency and brightness. Therefore, by arranging and using a light source in a region of at least a part of a side end surface of the lamp cover, the lamp cover of the present invention emits a high brightness when a light source is turned on and is thus excellent in visibility and is transparent and has a low presence when a light source is turned off and thus has an excellent design property. Furthermore, since uniform emitted light is obtained even in a large-sized application having a curved surface shape, the lamp cover is suitable for a lamp cover of a vehicle member or a combination lamp cover, having a curved surface shape.

Examples of a specific embodiment of the combination lamp cover include a combination lamp cover for an automobile, which has a transparent or semi-transparent headlamp cover or a rear lamp cover which does not substantially include a light diffusing agent, and the lamp cover of the present invention, in which the lamp cover of the present invention is arranged in a region of at least a part of the outer periphery or outer frame of the headlamp cover or the rear lamp cover.

"Does not substantially include" means that the content proportion of the light diffusing agent is less than 0.05 mass ppm with respect to the total mass of the transparent or semi-transparent headlamp cover or rear lamp cover.

Figure 3A:
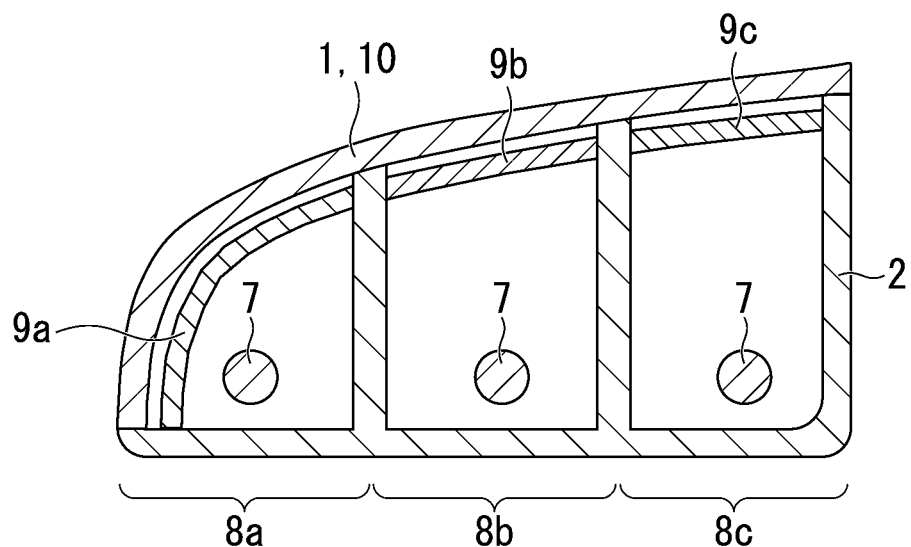
FIG. 3A is a schematic cross-sectional diagram seen from a top surface, showing an example of a combination lamp using a combination lamp cover of the present invention.
Figure 3B:
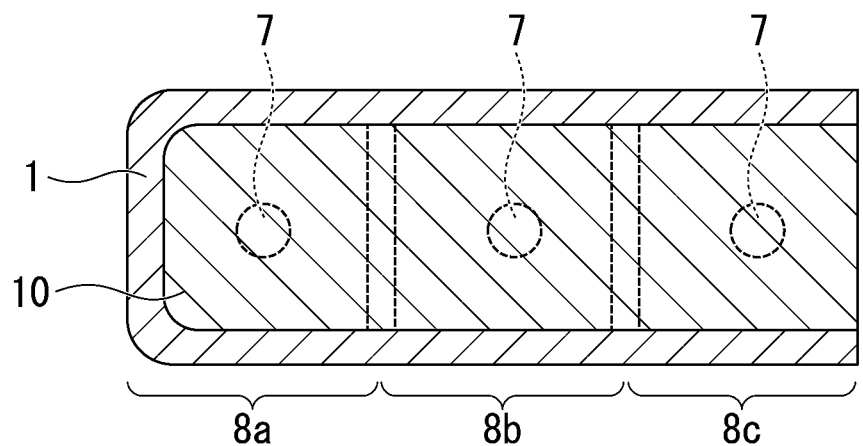
FIG. 3B is a schematic front diagram seen from a side surface, showing an example of a combination lamp using the combination lamp cover of the present invention.

FIGS. 3A and 3B are schematic cross-sectional views showing an example of a combination lamp using the combination lamp cover of the present invention. In the combination lamp cover 11 of FIGS. 3A and 3B, the lamp cover 1 of the present invention is arranged in a region of at least a part of the outer periphery or the outer frame of the transparent or semi-transparent headlamp cover or the rear lamp cover 10 which does not substantially include a light diffusing agent. The combination lamp cover 11 of FIGS. 3A and 3B is formed as an integrated lamp by covering one surface of the opening of the integrated housing 2 with the inner lens 9. At this time, in the rear combination lamps of FIGS. 3A and 3B, for example, since a direction indicator light portion 8a required to emit yellow light, a brake light portion 8b required to emit red light, and a rear indicator light portion 8c required to emit white light are necessary, the housing 2 is divided into the lamp chambers 8a to 8c by partition walls as shown in FIGS. 3A and 3B and the light sources 7 are arranged in these sections. The inner lens 9 side also has a structure in which, for example, a yellow inner lens 9a, a red inner lens 9b, and a white inner lens 9c corresponding to the lamp chambers 8a to 8c are formed.

The combination lamp cover is manufactured by injection molding of a plurality of components, preferably two components, at which time, only one component forming the lamp cover contains a light diffusing agent, and the other component forming a transparent or semi-transparent headlamp cover or rear lamp cover substantially does not contain a light diffusing agent. In this manner, it is possible to manufacture a lamp cover in which the component containing the light diffusing agent exhibits a specific shape or pattern. By arranging and using the light source in a region of at least a part of the side end surface of the lamp cover of the combination lamp cover, when the light source is off, that is, in the state where no light is incident, the lamp cover appears as a uniform and transparent molded body and has transparency and a low presence and thus has an excellent design property. However, since high brightness is emitted when a light source is turned on, only the portion of the lamp cover containing the light diffusing agent emits light, thus, the visibility is excellent.

The vehicle provided with the lamp cover or the combination lamp cover of the present invention has an excellent design property and lamp cover visibility.

EXAMPLES

A specific description will be given below of the present invention with reference to Examples, but the present invention is not limited thereto.
<Measurement Method>
Evaluations in the Examples and Comparative Examples were carried out by the following methods.
<Production of Test Piece>
Pellets of the transparent resin composition obtained in the Examples and Comparative Examples were supplied to an injection molding machine (model name "N70A", manufactured by The Japan Steel Works Ltd.), the molding temperature was 260° C., and a test piece (thickness 4 mm×width 50 mm×length 200 mm) was obtained.
(1) Total Light Transmittance (Tt)

As an index of transparency of the resin molded body, using a haze meter (model name: $Hm^{-1}00$, manufactured by Murakami Color Research Laboratory Co., Ltd.), the total light transmittance (%) of the test piece (thickness: 4 mm) was measured according to ISO13468 using a D65 light source. Using three test pieces, measurement was performed once for each test piece and the average value thereof was taken as the total light transmittance (Tt). Furthermore, determination was carried out using the following criteria.

AA: Total light transmittance of 78% or more and 87% or less

A: Total light transmittance of 75% or more and less than 78% or more than 87% and less than 91%

B: Total light transmittance of less than 75% or 91% or more
(2) Haze Value (H)

As an index of transparency of the resin molded body, using a haze meter (model name: $HM^{-1}00$, manufactured by Murakami Color Research Laboratory Co., Ltd.), the haze value (%) of the test piece (thickness: 4 mm) was measured according to ISO14782 using a D65 light source. Using three test pieces, measurement was performed once for each test piece and the average value thereof was used as the haze value (H). Furthermore, determination was carried out using the following criteria.

AA: Haze value is 6.0% or more and 13.0% or less

A: Haze value is 1.0% or more and less than 7.0% or more than 13.0% and 14.5% or less B: Haze value is less than 1.0% or more than 14.5 or more than 15%
(3) Yellowness Index (YI)

As an index of the transparency of the test piece, using a spectrophotometer (model name: U4100, manufactured by Hitachi High-Tech Corporation), the yellowness index of the test piece (thickness: 4 mm) was measured according to ISO17223 using a C light source. Using three test pieces, measurement was performed once for each test piece and the average value thereof was taken as the yellowness index (YI). Furthermore, determination was carried out using the following criteria.

AA: YI is 1.5 or less
A: YI is more than 1.5 and 7.0 or less
B: YI is more than 7.0

(4) H/Tt value, YI/H value

An H/Tt value and a YI/H value were calculated from the total light transmittance (Tt), haze value (H), and yellowness index (YI).

Regarding the transparent resin composition which is the first embodiment of the present invention and the resin molded body according to the second embodiment, the H/Tt value was determined using the following criteria. The determination results are shown in Table 2.

AA: H/Tt is 0.06 or more and 0.14 or less
A: H/Tt is 0.04 or more and less than 0.06 or more than 0.14 and 0.18 or less
B: H/T is less than 0.04 or more than 0.18

Regarding the transparent resin composition which is the first embodiment of the present invention and the resin molded body which is the second embodiment, the YI/H value was determined using the following criteria. The determination results are shown in Table 2.

AA: YI/H is 0.15 or more and 0.24 or less
A: YI/H is 0.10 or more and less than 0.15 or is more than 0.24 and 0.28 or less
B: YI/H is less than 0.10 or more than 0.28

Regarding the transparent resin composition for the lamp cover, which is the sixth embodiment of the present invention, H/Tt was determined using the following criteria. The determination results are shown in Table 4.

AA: H/Tt is 0.02 or more and 0.18 or less
A: H/Tt is 0.01 or more and less than 0.02 or more than 0.18 and 0.20 or less
B: H/T is less than 0.01 or more than 0.20

Regarding the transparent resin composition for a lamp cover, which is the sixth embodiment of the present invention, the YI/H value was determined using the following criteria. The determination results are shown in Table 4.

AA: YI/H is 0.1 or more and 0.6 or less
A: YI/H is −1.0 or more and less than 0.1 or more than 0.6 and 1.0 or less
B: YI/H is less than −1.0 or more than 1.0

(4) Brightness

As an index of the brightness of the resin molded body, the brightness ($cd/cm^2$) of a test piece was measured using a brightness meter (model name: RISA-COLOR/CD7, manufactured by HI-LAND). Using three test pieces, measurement was performed once for each test piece and the average value thereof was taken as the brightness.

(6) In-Plane Average Brightness

Figure 4:
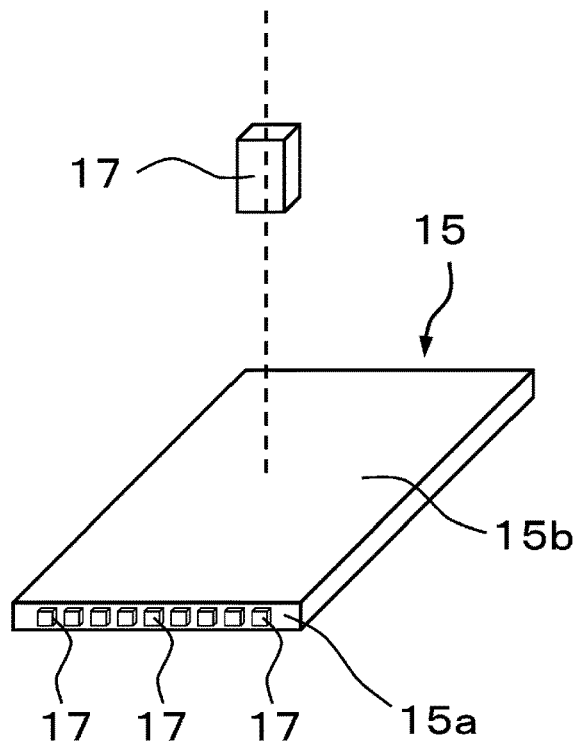
FIG. 4 is a schematic diagram for illustrating a method for measuring a brightness attenuation coefficient, a brightness retention coefficient, and an in-plane average brightness.
Figure 5:
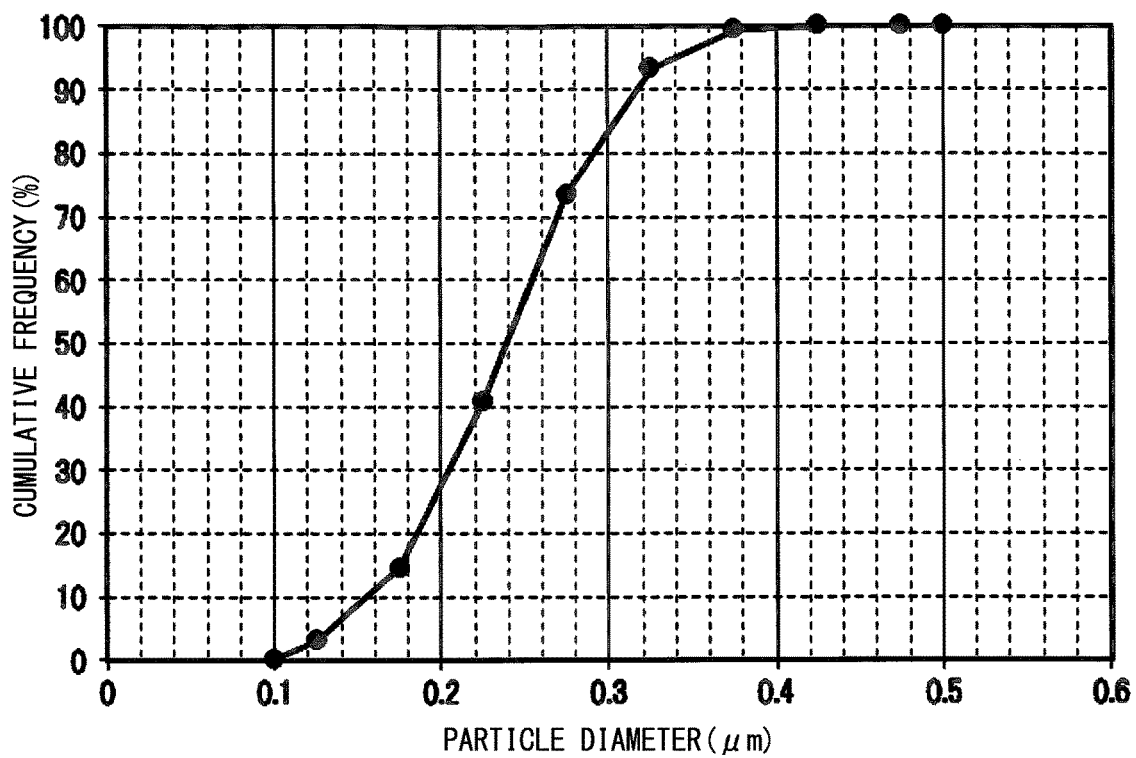
FIG. 5 is a cumulative frequency distribution curve of titanium dioxide (1) used as a light diffusing agent in the Examples.
Figure 6:
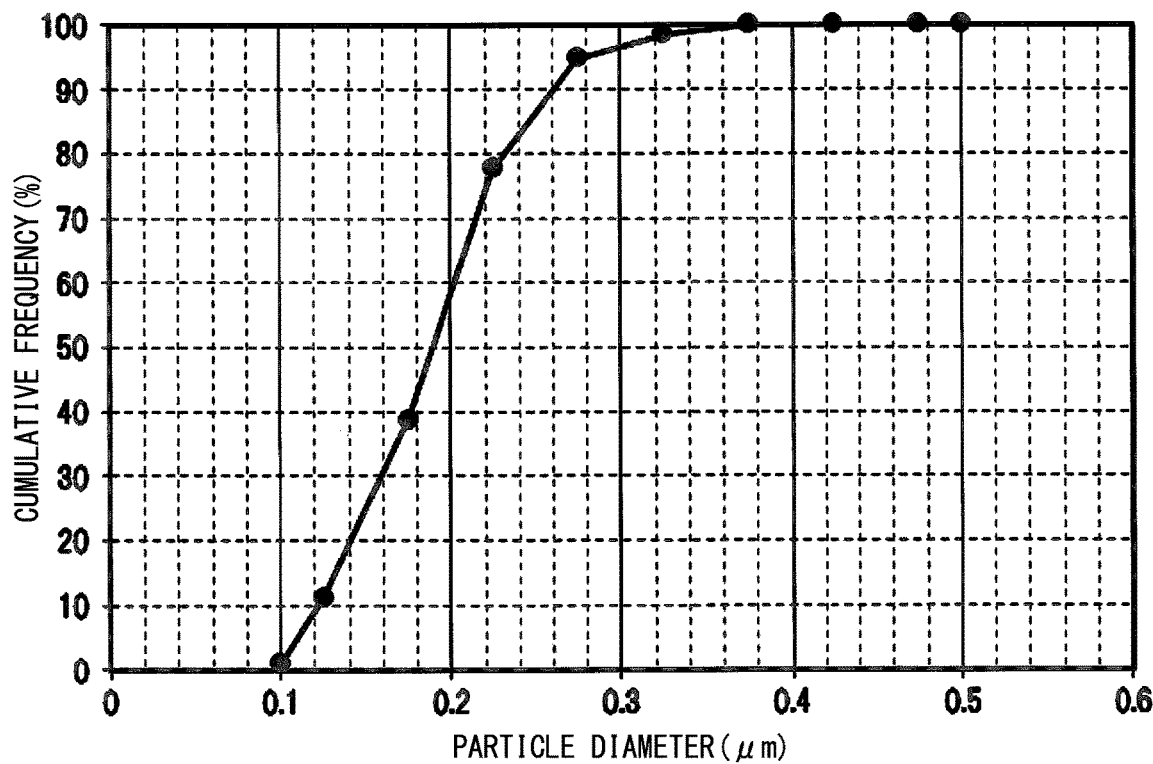
FIG. 6 is a cumulative frequency distribution curve of titanium dioxide (2) used as a light diffusing agent in the Examples.

As an index of the brightness of the light emitted from the resin molded body, the in-plane average brightness of a test piece was measured by the following method. FIG. 4 is a schematic diagram for illustrating a method for measuring the in-plane average brightness.

One of the 4 mm thick×50 mm wide surfaces of the flat plate-shaped test piece 15 (thickness 4 mm×width 50 mm×length 200 mm) was used as the light incidence end surface 15a, and one of the 50 mm wide×200 mm long surfaces was used as the light emission surface 15b. An LED edge light in which forty LED light sources 17 (4 mm surface mount type) were lined up at 5 mm intervals was arranged so as to be adjacent to the light incidence end surface. The output of the LED light source was adjusted such that the maximum value of the brightness of the light emitted from the test piece was 2200 $cd/m^2$ or less.

A line connecting the central portion of the light incidence end surface and the central portion of the end surface (200 mm from the light incidence end surface) opposing the light incidence end surface was divided into 10 equal parts at 20 mm intervals from the light incidence end surface to provide points at 11 places.

When measuring the brightness and chromaticity coordinates (x, y), the light incidence end surface (0 mm from the light incidence end surface) and the end surface opposing the light incidence end surface (200 mm from the light incidence end surface) are easily influenced by reflected light, thus, excluding 3 points of 0 mm, 20 mm, and 40 mm from the light incidence end surface side, and 2 points of 0 mm and 20 mm from the end surface opposite to the light incidence end surface, brightness measurement points were set at 6 places, and the brightness was measured by a brightness meter 17 according to the method described in "(4) Brightness".

When measuring the brightness and chromaticity coordinates, a black cloth was arranged on the surface opposing the light emission surface to avoid the influence of incident light from the surface opposing the light emission surface.

The in-plane average brightness was the average value of the measured brightness values at the 6 places described above. Furthermore, determination was carried out using the following criteria.

AA: In-plane average brightness of 1000 $cd/m^2$ or more
A: In-plane average brightness of 500 $cd/m^2$ or more and less than 1000 $cd/m^2$
B: In-plane average brightness of less than 500 $cd/m^2$ (Brightness Attenuation Coefficient, Brightness Retention Coefficient)

As an index of the balance between transparency and brightness, the brightness attenuation coefficient was measured as an index of the brightness of light emitted from the resin molded body, and the brightness retention coefficient was measured by the following methods.

1) A flat plate-shaped test piece (thickness 4 mm×width 50 mm×length 200 mm) was placed on a test stand installed in a dark room, and one 4 mm×50 mm surface was set as a light incidence end surface, and one 50 mm×200 mm surface was set as a light emission surface. A black cloth was arranged on the surface (rear surface side) corresponding to the light emission surface of the test piece, in order to absorb the light emitted to the rear surface side.

2) An LED edge light in which 40 LED light sources (4 mm surface mount type) were lined up at 5 mm intervals was arranged so as to be adjacent to the light incidence end surface of the test piece.

3) A brightness meter (model name: RISA-COLOR/CD7, manufactured by Hyland) was installed such that the distance between the detection surface of the brightness meter and the light emission surface of the test piece was 2000 mm.

4) The light of the LED light source was incident from the light incidence end surface. At this time, the output of the LED light source was adjusted such that the maximum value of the brightness of the light emitted from the test piece was 2200 $cd/m^2$ or less.

5) The position of the incident end surface was set as 0 m, the brightness (unit: $cd/cm^2$) was measured at three points of 0.06 m, 0.08 m, and 0.10 m from the incident end surface on the main plane in contact with the incident end surface.

6) The relationship between the logarithm of the brightness value (unit: $cd/cm^2$) and the distance from the end surface (unit: m) was plotted and the slope of the straight line obtained by the linear approximation was used as the brightness attenuation coefficient (unit: $m^{-1}$).

7) The obtained brightness attenuation coefficient was divided by the haze value (H) measured by the method described above to obtain a brightness retention coefficient ($m^{-1}/\%$).

The obtained brightness attenuation coefficient was determined using the following criteria.

AA: Brightness attenuation coefficient was 15 $m^{-1}$ or more and 20 $m^{-1}$ or less A: Brightness attenuation coefficient was 10 $m^{-1}$ or more and less than 15 $m^{-1}$ or more than 20 $m^{-1}$ and less than 30 $m^{-1}$ B: Brightness attenuation coefficient was less than 10 $m^{-1}$ or more than 30 $m^{-1}$ The obtained brightness retention coefficient was determined using the following criteria.

AA: Brightness retention coefficient was 2.0 $m^{-1}/\%$ or more and 2.5 $m^{-1}/\%$ or less A: Brightness retention coefficient was 1.5 $m^{-1}/\%$ or more and less than 2.0 $m^{-1}/\%$ Or more than 2.5 $m^{-1}/\%$ and 3.5 $m^{-1}/\%$ or less B: Brightness retention coefficient was less than 1.5 $m^{-1}/\%$ or more than 3.5 $m^{-1}/\%$ (7) Average Particle Diameter and Particle Diameter Distribution ($D_{90}/D_{10}$) of Light Diffusing Agent The average particle diameter and particle diameter distribution of the light diffusing agent (for example, $TiO_2$ or the like) were measured by the following method.

The slide glass was immersed in a formvar solution, quickly taken out, and dried at room temperature. Next, collodion and isoamyl acetate were added to the particles of the light diffusing agent and kneaded to create a sample paste, which was applied on a slide glass and dried at room temperature. After drying, the dried sample on the slide glass was cut using a pair of tweezers, then, the slide glass was tilted, and the slide glass was gradually immersed in water in a petri dish. A sample which was peeled off from the slide glass and floated on the water surface was scooped on a micro grid (150 mesh, copper round hole) with tweezers, placed on filter paper, dried, and used as a TEM observation sample.

A transmission electron microscope photograph (TEM photograph) of a TEM observation sample was taken according to a known method using a transmission electron microscope (model name: H-7000 type, manufactured by Hitachi Ltd.).

For the average particle diameter of the light diffusing agent, 50 particles of the light diffusing agent were arbitrarily selected on the obtained TEM photograph using an image analyzer (Luzex AP, manufactured by Nireco Corporation), the maximum particle diameter of the particles of each light diffusing agent was measured, and the average value of the measured values was set as the average particle diameter of the light diffusing agent.

For the particle diameter distribution of the light diffusing agent, 200 particles of the light diffusing agent were arbitrarily selected on the obtained TEM photograph using an image analyzer (Luzex AP, manufactured by Nireco Corporation), then, the maximum particle diameter of the particles of each light diffusing agent was measured and set as the particle diameter of the light diffusing agent. Next, 200 particle diameters of the light diffusing agent were classified into each category of a category of more than 0.0 μm and 0.10 μm or less, a category of more than 0.10 and less than 0.15 μm, a category of more than 0.15 μm and less than 0.20 μm, a category of more than 0.20 μm and less than 0.25 μm, a category of more than 0.25 μm and less than 0.30 μm, a category of more than 0.30 μm and less than 0.35 μm, a category of more than 0.35 μm and less than 0.40 μm, a category of more than 0.40 μm and less than 0.45 μm, a category of more than 0.45 μm and less than 0.50 μm, and a category of more than 0.50 μm and less than 0.55 μm, the frequency ratio (unit: %) of each category was calculated, and a frequency distribution curve of the particle diameters, which was approximated by a normal distribution curve, was created. Next, a cumulative frequency distribution curve was created from the frequency distribution curve, the particle diameter at which the cumulative frequency was 90% was $D_{90}$, the particle diameter at which the cumulative frequency was 10% was $D_{10}$, and the ratio of $D_{90}$ and $D_{10}$ ($D_{90}/D_{10}$) was calculated.

(8) Light Diffusing Agent Content Proportion

The ratio of the light diffusing agent (for example, $TiO_2$ or the like) in the test piece was measured by method described above. The test piece was ashed by heating at 600° C., and the mass of the remaining ash was made equal to the content of the light diffusing agent (for example, $TiO_2$ or the like) in the test piece, and a value obtained by dividing the mass of ash by the mass of the test piece was set as the content (mass ppm) of the light diffusing agent.

<Raw Material>

Methacrylic-based resin (1) methyl methacrylate (MMA)-methyl acrylate (MA) copolymer, refractive index 1.492 (trade name: Acrypet VH, manufactured by Mitsubishi Chemical Corporation)

Titanium dioxide (1) Titanium dioxide particles with an average particle diameter of 260 nm, a refractive index of 2.70, and $D_{90}/D_{10}=2.13$ (trade name: R-820, manufactured by Ishihara Sangyo Kaisha, Ltd.)

Titanium dioxide (2) Titanium dioxide particles with an average particle diameter of 210 nm, a refractive index of 2.70, and $D_{90}/D_{10}=2.17$ (trade name: CR-60, manufactured by Ishihara Sangyo Kaisha, Ltd.)

Titanium dioxide (3) Titanium dioxide needle crystal particles with a minor axis of 270 nm×major axis of 5150 nm and a refractive index of 2.70 (trade name: FTL-300, manufactured by Ishihara Sangyo Kaisha, Ltd.)

Titanium dioxide (4) Titanium dioxide particles with an average particle diameter of 100 nm and a refractive index of 2.70 (trade name: PT-401L, Ishihara Sangyo Kaisha, Ltd.)

Titanium dioxide (5) Non-spherical particles of titanium dioxide with a minor axis of 10 nm×major axis of 30 nm and a refractive index of 2.70 (trade name: TTO-51, Ishihara Sangyo Kaisha, Ltd.)

Titanium dioxide (6): Titanium dioxide particles (mixture) in which titanium dioxide (2) and titanium dioxide (7) are mixed in a mass ratio of 20:80, having an average particle diameter of 298 nm, a refractive index of 2.70, and $D_{90}/D_{10}=2.59$ Titanium dioxide (7) Titanium dioxide particles with an average particle diameter of 320 nm and a refractive index of 2.70 (trade name: R-820N, Ishihara Sangyo Kaisha, Ltd.)

Barium sulfate (1) Barium sulfate particles with an average particle diameter of 2000 nm and a refractive index of 1.650 (trade name: AD barium sulfate, manufactured by Nippon Chemical Industrial Co., Ltd.)

Barium sulfate (2) Barium sulfate particles with an average particle diameter of 30 nm and a refractive index of 1.640 (trade name: BF-20, manufactured by Sakai Chemical Industry Co., Ltd.)

Silicone beads (1) Silicone beads with an average particle diameter of 2000 nm and a refractive index of 1.420 (trade name: TSR9000, manufactured by Momentive Performance Materials Japan LLC)

Examples 1 to 3 and Comparative Examples 1 to 11 relate to a resin molded body including the transparent resin composition according to the first embodiment of the present invention and the transparent resin composition according to the second embodiment.

Examples 4 to 7 and Comparative Examples 12 to 25 relate to combination lamp covers having a lamp cover which is the sixth embodiment of the present invention and the lamp cover which is the seventh embodiment.

Example 1

100 parts by mass of methacrylic-based resin (1) as a transparent resin and 0.00134 parts by mass of titanium dioxide (1) as a light diffusing agent were supplied to a twin-shaft extruder (model name "PCM45", manufactured by Ikegai Corp.), and the mixture was kneaded at 250° C. to obtain a pellet-shaped transparent resin composition (the content proportion of the light diffusing agent was 13.4 ppm by mass). According to the method described above, plate-shaped test pieces (thickness 4 mm×width 50 mm×length 200 mm) were created from the obtained transparent resin composition pellets.

The obtained test pieces were evaluated according to the evaluation method described above. The evaluation results are shown in Table 2.

Example 2, Comparative Examples 1 to 7

A test piece was produced by the same method as in Example 1 except that the type of light diffusing agent and the added amount (content proportion) of the light diffusing agent were the conditions described in Table 1. The evaluation results of the obtained test pieces are shown in Table 2.

Example 3, Comparative Examples 8 to 11

A test piece was produced by the same method as in Example 1 except that the type of light diffusing agent and the added amount (content proportion) of the light diffusing agent were the conditions described in Table 1. The evaluation results of the obtained test pieces are shown in Table 2.

Example 4

100 parts by mass of methacrylic-based resin (1) as a transparent resin and 0.0001 parts by mass of titanium dioxide (1) as a light diffusing agent were supplied to a twin-shaft extruder (model name "PCM45", manufactured by Ikegai Corp.), and the mixture was kneaded at 250° C. to obtain a pellet-shaped transparent resin composition for lamp covers (the content of the light diffusing agent was 0.1 mass ppm). According to the method described above, plate-shaped test pieces (thickness 4 mm×width 50 mm×length 200 mm) were created from the obtained transparent resin composition pellets.

The obtained test pieces were evaluated according to the evaluation method described above. The evaluation results are shown in Table 4.

Examples 5 to 7, Comparative Examples 12 to 24

A test piece was produced in the same manner as in Example 1 except that the type of light diffusing agent and the added amount (content) of the light diffusing agent were the conditions described in Table 3. Table 4 shows the evaluation results of the obtained test pieces.

Example 25

Example of Combination Lamp Cover:

A combination lamp cover, in which the outline of a headlamp cover of an automobile is lit up by light from an LED light source, was manufactured by the following method: Using a two-component injection molding method, a combination lamp cover was manufactured by integrally forming a headlamp cover formed of a polycarbonate-based resin (trade name: Iupilon HL-3503 manufactured by Mitsubishi Engineering Plastics Co., Ltd.) with a lamp cover formed of the transparent resin composition of Example 1 which was arranged on the outer edge of the headlamp cover.

After that, the combination lamp cover was arranged on the headlamp cover of the automobile and the LED light source was arranged such that it is possible for the light of the LED light source to be incident from the side of the lamp cover. In a state where the LED light source is not turned on, the outline of the headlamp cover is not recognized.

However, in a state where the LED light source is turned on, when the light from the LED light source passes through the inside of the lamp cover, due to the effect of the light diffusing agent, the light is emitted and the outline of the headlamp cover floats and lights up. On the other hand, when the light of the LED light source passes through the inside of the headlamp cover formed of polycarbonate-based resin, there is no light. That is, only the outline of the headlamp cover of the combination lamp cover was seen to stand out due to the light from the LED light source.

TABLE 1

| | Transparent resin Type | Light Diffusing Agent Type | Average particle diameter | Content (ppm) | $D_{90}/D_{10}$ | Refractive index difference between transparent resin and light diffusing agent |
|---|---|---|---|---|---|---|
| Example 1 | Methacrylic-based resin (1) | Titanium dioxide (1) | 260 nm | 13.4 | 2.13 | 1.208 |
| Example 2 | Methacrylic-based resin (1) | Titanium dioxide (1) | 260 nm | 7.8 | 2.13 | 1.208 |
| Comparative Example 1 | Methacrylic-based resin (1) | Titanium dioxide (1) | 260 nm | 2.4 | 2.13 | 1.208 |
| Comparative Example 2 | Methacrylic-based resin (1) | Titanium dioxide (1) | 260 nm | 1.2 | 2.13 | 1.208 |
| Comparative Example 3 | Methacrylic-based resin (1) | Titanium dioxide (2) | 210 nm | 1.2 | 2.17 | 1.208 |
| Comparative Example 4 | Methacrylic-based resin (1) | Titanium dioxide (2) | 210 nm | 0.6 | 2.17 | 1.208 |
| Comparative Example 5 | Methacrylic-based resin (1) | Titanium dioxide (3) | 270 nm, 5150 nm (short diameter, long diameter) | 10 | — | 1.208 |
| Comparative Example 6 | Methacrylic-based resin (1) | Titanium dioxide (4) | 100 nm | 10 | — | 1.208 |

TABLE 1-continued

| | Transparent resin Type | Light Diffusing Agent Type | Average particle diameter | Content (ppm) | $D_{90}/D_{10}$ | Refractive index difference between transparent resin and light diffusing agent |
|---|---|---|---|---|---|---|
| Comparative Example 7 | Methacrylic-based resin (1) | Titanium dioxide (5) | 10 nm, 30 nm (short diameter, long diameter) | 10 | — | 1.208 |
| Example 3 | Methacrylic-based resin (1) | Titanium dioxide (6) | 298 nm | 13.4 | 2.59 | 1.208 |
| Comparative Example 8 | Methacrylic-based resin (1) | Titanium dioxide (1) | 260 nm | 30.0 | 2.13 | 1.208 |
| Comparative Example 9 | Methacrylic-based resin (1) | Titanium dioxide (1) | 260 nm | 50.0 | 2.13 | 1.208 |
| Comparative Example 10 | Methacrylic-based resin (1) | Titanium dioxide (2) | 210 nm | 13.4 | 2.17 | 1.208 |
| Comparative Example 11 | Methacrylic-based resin (1) | Titanium dioxide (7) | 320 nm | 13.4 | 2.70 | 1.208 |

TABLE 2

| | Total light transmittance (Tt) | | Haze value (H) | | Yellowness index (YI) | | In-plane average brightness | | Brightness attenuation coefficient |
|---|---|---|---|---|---|---|---|---|---|
| | % | Determination | % | Determination | — | Determination | cd/m² | Determination | m⁻¹ |
| Example 1 | 76.0 | A | 12.5 | AA | 2.0 | A | 970 | A | 27.8 |
| Example 2 | 82.0 | AA | 8.0 | AA | 1.2 | AA | 1235 | AA | 17.9 |
| Comparative Example 1 | 90.5 | A | 2.0 | A | 0.9 | AA | 871 | A | 7.32 |
| Comparative Example 2 | 91.0 | B | 1.5 | A | 0.7 | AA | 498 | B | 3.64 |
| Comparative Example 3 | 90.1 | A | 2.8 | A | 0.9 | AA | 913 | A | 5.61 |
| Comparative Example 4 | 91.1 | B | 1.7 | A | 0.9 | AA | 541 | A | 1.62 |
| Comparative Example 5 | 87.9 | A | 8.1 | AA | 0.7 | AA | 1301 | AA | 5.43 |
| Comparative Example 6 | 84.2 | AA | 5.6 | AA | 10.0 | B | 1240 | AA | 11.8 |
| Comparative Example 7 | 91.6 | B | 0.5 | B | 1.0 | AA | 173 | B | 1.28 |
| Example 3 | 82.5 | AA | 14.2 | A | 2.3 | A | 1038 | AA | 27.5 |
| Comparative Example 8 | 72.8 | A | 31.6 | B | 3.5 | A | 259 | B | 43.3 |
| Comparative Example 9 | 64.7 | B | 49.6 | B | 5.0 | A | 130 | B | 40.1 |
| Comparative Example 10 | 79.5 | AA | 13.8 | A | 8.5 | B | 972 | A | 31.6 |
| Comparative Example 11 | 82.4 | AA | 14.8 | B | 0.8 | AA | 1274 | AA | 26.6 |

| | Brightness attenuation coefficient | Brightness retention coefficient | | H/Tt | | YI/H | |
|---|---|---|---|---|---|---|---|
| | Determination | m⁻¹/% | Determination | — | Determination | — | Determination |
| Example 1 | A | 2.22 | AA | 0.164 | A | 0.160 | AA |
| Example 2 | AA | 2.23 | AA | 0.098 | AA | 0.150 | AA |
| Comparative Example 1 | B | 3.66 | B | 0.022 | B | 0.450 | B |
| Comparative Example 2 | B | 2.43 | AA | 0.016 | B | 0.467 | B |
| Comparative Example 3 | B | 2.00 | A | 0.031 | B | 0.321 | B |
| Comparative Example 4 | B | 0.95 | B | 0.019 | B | 0.529 | B |
| Comparative Example 5 | B | 0.67 | B | 0.092 | AA | 0.086 | A |
| Comparative Example 6 | B | 2.11 | AA | 0.067 | AA | 1.786 | B |
| Comparative Example 7 | B | 2.56 | A | 0.005 | B | 2.000 | B |
| Example 3 | A | 1.87 | A | 0.172 | A | 0.162 | AA |
| Comparative Example 8 | B | 1.37 | B | 0.434 | B | 0.111 | A |
| Comparativ Example 9 | B | 0.81 | B | 0.767 | B | 0.101 | A |
| Comparative Example 10 | B | 2.29 | AA | 0.174 | A | 0.616 | B |

TABLE 2-continued

| | | | | | | | | |
|---|---|---|---|---|---|---|---|---|
| Comparative Example 11 | A | 1.80 | A | 0.180 | A | 0.054 | B | |

TABLE 3

| | Transparent resin Type | Light Diffusing Agent | | | Refractive index difference between transparent resin and light diffusing agent |
|---|---|---|---|---|---|
| | | Type | Average particle diameter | Content (ppm) | |
| Example 4 | Acrylic resin (1) | Titanium dioxide (1) | 260 nm | 1.0 | 1.208 |
| Example 5 | Acrylic resin (1) | Titanium dioxide (1) | 260 nm | 10 | 1.208 |
| Example 6 | Acrylic resin (1) | Titanium dioxide (2) | 210 nm | 1.0 | 1.208 |
| Example 7 | Acrylic resin (1) | Titanium dioxide (2) | 210 nm | 10 | 1.208 |
| Comparative Example 12 | Acrylic resin (1) | — | — | — | — |
| Comparative Example 13 | Acrylic resin (1) | Titanium dioxide (3) | 270 nm, 5150 nm (short diameter, long diameter) | 1.0 | 1.208 |
| Comparative Example 14 | Acrylic resin (1) | Titanium dioxide (3) | 270 nm, 5150 nm (short diameter, long diameter) | 10 | 1.208 |
| Comparative Example 15 | Acrylic resin (1) | Titanium dioxide (4) | 100 nm | 1.0 | 1.208 |
| Comparative Example 16 | Acrylic resin (1) | Titanium dioxide (4) | 100 nm | 10 | 1.208 |
| Comparative Example 17 | Acrylic resin (1) | Titanium dioxide (5) | 10 nm, 30 nm (short diameter, long diameter) | 1.0 | 1.208 |
| Comparative Example 18 | Acrylic resin (1) | Titanium dioxide (5) | 10 nm, 30 nm (short diameter, long diameter) | 10 | 1.208 |
| Comparative Example 19 | Acrylic resin (1) | Titanium dioxide (1) | 2 μm | 10 | 0.158 |
| Comparative Example 20 | Acrylic resin (1) | Titanium dioxide (1) | 2 μm | 1.0 | 0.158 |
| Comparative Example 21 | Acrylic resin (1) | Titanium dioxide (2) | 30 nm | 1.0 | 0.148 |
| Comparative Example 22 | Acrylic resin (1) | Titanium dioxide (2) | 30 nm | 10 | 0.148 |
| Comparative Example 23 | Acrylic resin (1) | Titanium dioxide (1) | 2 μm | 1.0 | 0.072 |
| Comparative Example 24 | Acrylic resin (1) | Titanium dioxide (1) | 2 μm | 10 | 0.072 |

TABLE 4

| | Total light transmittance (Tt) | | Haze value (H) | | Yellowness index (YI) | | In-plane average brightness | |
|---|---|---|---|---|---|---|---|---|
| | % | Determination | % | Determination | — | Determination | cd/m² | |
| Example 4 | 90.8 | A | 2.0 | A | 0.8 | AA | 535 | A |
| Example 5 | 84.0 | AA | 11.6 | AA | 1.6 | A | 1097 | AA |
| Example 6 | 90.6 | A | 1.35 | A | 1.3 | A | 649 | A |
| Example 7 | 82.4 | AA | 10.2 | AA | 6.6 | A | 1060 | AA |
| Comparative Example 12 | 91.8 | B | 0.20 | B | 0.5 | AA | 90 | B |
| Comparative Example 13 | 91.4 | B | 1.2 | A | 0.6 | AA | 324 | B |
| Comparative Example 14 | 87.9 | A | 8.1 | AA | 0.7 | AA | 1301 | AA |
| Comparative Example 15 | 91.0 | B | 0.95 | B | 1.6 | A | 547 | A |
| Comparative Example 16 | 84.2 | AA | 5.6 | A | 10.0 | B | 1240 | AA |
| Comparative Example 17 | 91.8 | B | 0.40 | B | 0.7 | AA | 78 | B |
| Comparative Example 18 | 91.6 | B | 0.50 | B | 1.0 | AA | 173 | B |
| Comparative Example 19 | 91.8 | B | 1.3 | A | 0.6 | AA | 122 | B |
| Comparative Example 20 | 92.1 | B | 0.50 | B | 0.6 | AA | 65 | B |
| Comparative Example 21 | 91.8 | B | 0.35 | B | 0.7 | AA | 53 | B |
| Comparative Example 22 | 91.9 | B | 0.30 | B | 0.6 | AA | 60 | B |
| Comparative Example 23 | 91.8 | B | 0.75 | B | 0.6 | AA | 57 | B |
| Comparative Example 24 | 91.9 | B | 3.5 | A | 0.6 | AA | 90 | B |

TABLE 4-continued

| | Brightness retention coefficient | | H/Tt | | YI/H | |
|---|---|---|---|---|---|---|
| | $m^{-1}/\%$ | Determination | — | Determination | — | Determination |
| Example 4 | 1.56 | A | 0.022 | AA | 0.400 | AA |
| Example 5 | 1.37 | A | 0.138 | AA | 0.138 | AA |
| Example 6 | 2.28 | AA | 0.015 | A | 0.963 | A |
| Example 7 | 1.69 | A | 0.124 | AA | 0.647 | A |
| Comparative Example 12 | 11.2 | B | 0.002 | B | 2.500 | B |
| Comparative Example 13 | 1.89 | A | 0.013 | A | 0.500 | AA |
| Comparative Example 14 | 0.67 | B | 0.092 | AA | 0.086 | A |
| Comparative Example 15 | 1.94 | A | 0.010 | A | 1.684 | B |
| Comparative Example 16 | 2.11 | AA | 0.067 | AA | 1.786 | B |
| Comparative Example 17 | 2.31 | AA | 0.004 | B | 1.750 | B |
| Comparative Example 18 | 2.57 | A | 0.005 | B | 2.000 | B |
| Comparative Example 19 | 1.01 | B | 0.014 | A | 0.462 | AA |
| Comparative Example 20 | 1.55 | A | 0.005 | B | 1.200 | B |
| Comparative Example 21 | 3.56 | B | 0.004 | B | 2.000 | B |
| Comparative Example 22 | 2.60 | A | 0.003 | B | 2.000 | B |
| Comparative Example 23 | 2.33 | AA | 0.008 | B | 0.800 | A |
| Comparative Example 24 | 0.31 | B | 0.038 | AA | 0.171 | AA |

The test pieces of Examples 1 to 3 had transparency, brightness, a low coloring property, and an excellent balance between transparency and brightness. In the test piece of Example 3 $D_{90}/D_{10}$ was large, thus, the balance between transparency and brightness, which is indicated by the brightness retention coefficient, was slightly lower than that of Example 1.

In the test piece of Comparative Example 1, the content proportion of the light diffusing agent was small, thus, the brightness and the balance between the transparency and the brightness indicated by the brightness retention coefficient were insufficient.

In the test piece of Comparative Example 2, the content proportion of the light diffusing agent was small, thus, the brightness indicated by the brightness attenuation coefficient was insufficient.

In the test piece of Comparative Example 3, the average particle diameter of the light diffusing agent was as small as 200 nm and the content proportion of the light diffusing agent was small, thus, the brightness indicated by the brightness attenuation coefficient was insufficient.

In the test piece of Comparative Example 4, the average particle diameter of the light diffusing agent was as small as 200 nm and the content proportion of the light diffusing agent was small, thus, the transparency was excessively high and the brightness indicated by the brightness attenuation coefficient and the balance between transparency and brightness indicated by the brightness retention coefficient were insufficient.

In the test piece of Comparative Example 5, the average particle diameter of the light diffusing agent was as large as 5150 nm, thus, the brightness indicated by the brightness attenuation coefficient and the balance between transparency and brightness indicated by the brightness retention coefficient were insufficient.

In the test piece of Comparative Example 6, the average particle diameter of the light diffusing agent was as small as 100 nm, thus, coloring was observed. Furthermore, the brightness indicated by the brightness attenuation coefficient was insufficient.

In the test piece of Comparative Example 7, the average particle diameter of the light diffusing agent was as small as 30 nm, thus, coloring was observed. Furthermore, the transparency was excessively high and the brightness indicated by the brightness attenuation coefficient was insufficient.

The test pieces of Comparative Examples 8 and 9 had a high content proportion of the light diffusing agent, thus, the transparency was low and the brightness and the balance between the transparency and brightness indicated the brightness retention coefficient were insufficient.

In the test piece of Comparative Example 10, since the average particle diameter of the light diffusing agent was as small as 210 nm, coloring was observed. Furthermore, the brightness indicated by the brightness attenuation coefficient was insufficient.

In the test piece of Comparative Example 11, the average particle diameter of the light diffusing agent was as large as 320 nm, thus, the transparency was insufficient.

The test pieces of Examples 4 to 7 had an excellent transparency, brightness, low coloring property, and balance between transparency and brightness, and were suitable for a lamp cover.

Since the test piece of Comparative Example 12 did not include a light diffusing agent, the brightness was inferior.

In the test piece of Comparative Example 13, the average particle diameter of the light diffusing agent was large and the content was 1.0 ppm, thus, the transparency was excessively high and the brightness was insufficient.

In the test piece of Comparative Example 14, the average particle diameter of the light diffusing agent was large and the content was 10 ppm, thus, the balance between transparency and brightness was insufficient.

In the test piece of Comparative Example 15, the average particle diameter of the light diffusing agent was small (100 nm) and the content was 1.0 ppm, thus, the transparency was excessively high and the YI/H value was low.

In the test piece of Comparative Example 16, the average particle diameter of the light diffusing agent was small (100 nm) and the content was 10 ppm, thus, coloring was observed.

In the test pieces of Comparative Examples 17 and 18, the average particle diameter of the light diffusing agent was small, thus, the transparency was excessively high and the brightness was insufficient.

In the test pieces of Comparative Examples 19 and 20, the average particle diameter of the light diffusing agent was large (2 μm) and a refractive index difference between the transparent resin and the light diffusing agent was small, thus, the transparency was excessively high and the brightness was insufficient.

In the test pieces of Comparative Examples 21 and 22, the refractive index difference between the transparent resin and the light diffusing agent was small and the average particle diameter of the light diffusing agent was small (30 nm), thus, the transparency was excessively high and the brightness was insufficient.

In the test pieces of Comparative Examples 23 and 24, the refractive index difference between the transparent resin and the light diffusing agent was small and the average particle diameter of the light diffusing agent was large, thus, the transparency was excessively high and the brightness was insufficient.

INDUSTRIAL AVAILABILITY

In the resin molded body of the present invention, for example, a light source such as an LED is arranged in a region of at least a part of the side end surface of the resin molded body and is able to guide and emit the light incident from the end surface into the resin molded body in the in-plane direction. Since coloring is suppressed and the resin molded body is transparent and has a low presence when a light source is turned off, the design property is excellent, and since high brightness is emitted when a light source is turned on, the visibility is excellent. In addition, the balance between transparency and brightness is excellent.

It is possible to use the transparent resin composition and the resin molded body including the transparent resin composition for applications such as vehicle interior/exterior members, lamp covers for illumination lamps, and light guides for planar light source devices, in particular, in applications as a vehicle interior/exterior member, the above are suitable as a vehicle lamp cover, a visor, a meter panel, a pillar, a combination lamp cover, and the like.

It is possible to use the lamp cover of the present invention in a lamp cover or a combination lamp cover of a vehicle such as an automobile such as a headlamp cover or a rear lamp cover.

In the lamp cover of the present invention, for example, a light source such as an LED is arranged in a region of at least a part of the side end surface of the lamp cover and the light incident from the end surface is guided into the lamp cover and emitted in the surface direction such that use is possible as a light guide plate or a surface light source. Since high brightness is emitted when a light source is turned on, the visibility is excellent, and since there is transparency and a low presence when the light source is turned off, the design property is excellent. It is possible to suitably use such a lamp cover or combination lamp cover for vehicles.

REFERENCE SIGNS LIST

1 Lamp cover
2 Housing
3 Projection lens
4 LED light source
5 Support substrate
6 Halogen lamp
7 Light source
8a Direction indicator light portion
8b Brake light portion
8c Rear indicator light portion
9a Yellow inner lens
9b Red inner lens
9c White inner lens
10 Transparent or semi-transparent lamp cover which does not substantially contain light diffusing agent
11 Combination lamp cover
15 Resin molded body (test piece)
15a Light incidence end surface
15b Light emission surface
16 LED light source
17 Brightness meter
18 Resin molded body
19 Power supply unit
20 Power cord
21 Vehicle
22 Vehicle lamp cover
23 Visor
24 Pillar
25 Light-shielding member (black cutting sheet)
26 Light-transmitting portion

The invention claimed is:

1. A transparent resin composition, consisting essentially of:
    a transparent resin that is a methacrylic-based resin; and
    a light diffusing agent which is titanium dioxide particles and has an average particle diameter in a range of from 210 to 300 nm,
    wherein a content proportion of the light diffusing agent is in a range of from 7.2 to 16 mass ppm, with respect to a total mass of the transparent resin composition.

2. The composition according of claim 1, wherein a ratio ($D_{99}/D_{10}$) of a 90% cumulative average particle diameter ($D_{90}$) to a 10% cumulative average particle diameter ($D_{10}$) in a cumulative distribution curve of particle diameters of the light diffusing agent is in a range of from 1.2 to 2.5.

3. The composition of claim 1, wherein a refractive index difference between the transparent resin and the light diffusing agent is in a range of from 0.3 to 3.0.

4. The composition of claim 1, wherein the average particle diameter of the light diffusing agent is in a range of from 220 to 280 nm.

5. A resin molded body, comprising:
    the transparent resin composition of claim 1.

6. A resin molded article, comprising:
    the transparent resin composition of claim 1,
    wherein a total light transmittance (Tt) measured according to ISO 13468 in a thickness direction is in a range of from 75 to less than 91%, a haze value (H) measured according to ISO14782 in the thickness direction is in a range of from 1.0 to 14.5%, and yellowness index (YI) in the thickness direction, total light transmittance (Tt), and haze value (H), measured according to ISO17223, satisfy Expressions (1) and (2):

$$0.04 \leq H/Tt \leq 0.18 \quad (1), \text{ and}$$

$$0.10 \leq YI/H \leq 0.28 \quad (2).$$

7. The article of claim 6, wherein an average particle diameter of the light diffusing agent is in a range of from 220 to 280 nm.

8. A resin molded body, comprising:
the transparent resin composition of claim 1,
wherein a total light transmittance (Tt) measured according to ISO 13468 in a thickness direction is in a range of from 75 to less than 91%,
a haze value (H) measured according to ISO14782 in the thickness direction is in a range of from 1.0 to 14.5%, and
a brightness attenuation coefficient ($m^{-1}$) is in a range of from 10 to 30 when the resin molded body guides light in a length direction of the resin molded body while scattering light in the thickness direction of the resin, molded body, and a brightness retention coefficient ($m^{-1}$/%) obtained by dividing the brightness attenuation coefficient by the haze value (%) of the resin molded body is in a range of from 1.5 to 3.5.

9. The body of claim 8, wherein an average particle diameter of the light diffusing agent is in a range of from 220 to 280 nm.

10. The body of claim 5, further comprising:
a light incidence end surface provided in a region of at least a part of a side end surface of the resin molded body, and
a light emission surface provided on at least one main surface of the resin molded body,
wherein an in-plane average brightness, which is an average value of brightness of the light emission surface, is 500 cd/$m^2$ or more.

11. The body of claim 5, wherein, in a cumulative frequency distribution curve of the particle diameter of the light diffusing agent, a ratio ($D_{90}/D_{10}$) of the particle diameter ($D_{90}$) having a cumulative frequency of 90% and the particle diameter ($D_{10}$) having a cumulative frequency of 10% is in a range of from 1.2 to 2.5.

12. The body of claim 5, wherein the resin molded body is any one selected from the group consisting of a vehicle interior/exterior member, a lamp cover for an illumination lamp, and a light guide for a planar light source device.

13. The body of claim 12, wherein the vehicle interior/exterior member is at least one type selected from the group consisting of a vehicle lamp cover, a visor, a meter panel, and a pillar.

14. A vehicle lamp cover, comprising:
the body of claim 5.

15. A combination lamp cover, comprising:
a transparent or semi-transparent headlamp cover or a rear lamp cover which does not substantially comprise a light diffusing agent; and
the vehicle lamp cover of claim 14,
wherein the vehicle lamp cover is arranged on an outer edge, or in a region of at least a part of the outer edge, of the headlamp cover or the rear lamp cover.

16. A vehicle, comprising:
the vehicle lamp cover of claim 14; or
a combination lamp cover, comprising:
a transparent or semi-transparent headlamp cover or a rear lamp cover which does not substantially comprise a light diffusing agent; and the vehicle lamp cover, the vehicle lamp cover being arranged on an outer edge, or in a region of at least a part of the outer edge, of the headlamp cover or the rear lamp cover.

17. A lamp cover, comprising:
the resin molded body of claim 5,
wherein a total light transmittance (Tt) measured according to ISO 13468 in a thickness direction is in a range of from 75 to less than 91%,
wherein a haze value (H) measured according to ISO14782 in the thickness direction is in a range of from 1.0 to 14.5%,
wherein a yellowness index (YI) measured according to ISO17223 in the thickness direction is 7.0 or less, and
wherein H/Tt and YI/H satisfy Expressions (3) and (4):

$$0.01 \leq H/Tt \leq 0.2 \quad (3); \text{ and}$$

$$-1.0 \leq YI/H \leq 1.0 \quad (4).$$

18. A lamp cover, comprising:
the resin molded body of claim 5,
wherein a total light transmittance (Tt) measured according to ISO 13468 in a thickness direction is in a range of from 75 to less than 91%,
wherein a haze value (H) measured according to ISO14782 in the thickness direction is in a range of from 1.0 to 14.5%, and
wherein a yellowness index (YI) measured according to ISO17223 in the thickness direction is 7.0 or less, and
wherein a brightness retention coefficient ($m^{-1}$/%) obtained by dividing a brightness attenuation coefficient ($m^{-1}$) when the lamp cover guides light in a length direction of the lamp cover while scattering light in the thickness direction of the lamp cover, by a haze value (%) of the lamp cover is in a range of from 1.5 to 3.5.

19. The lamp cover of claim 17, wherein a refractive index difference between the transparent resin and the light diffusing agent is in a range of from 0.3 to 3.0.

20. The lamp cover of claim 17, further comprising:
a light incidence end surface provided in a region of at least a part of a side end surface of the lamp cover; and
a light emission surface provided on at least one main surface of the lamp cover,
wherein an in-plane average brightness, which is an average value of brightness on the light emission surface, is 500 cd /$m^2$ or more.

21. A combination lamp cover, comprising:
a transparent or semi-transparent headlamp cover or a rear lamp cover which does not substantially comprise a light diffusing agent; and
the lamp cover of claim 17,
wherein the lamp cover is arranged in a region of at least a part of an outer periphery or an outer frame of the headlamp cover or the rear lamp cover.

22. A vehicle, comprising:
the lamp cover of claim 17; or
a combination lamp cover, comprising:
a transparent or semi-transparent headlamp cover or a rear lamp cover which does not substantially comprise a light diffusing agent; and the lamp cover, the lamp cover being arranged in a region of at least a part of an outer periphery or an outer frame of the headlamp cover or the rear lamp cover.

23. The composition of claim 1, wherein the average particle diameter of the light diffusing agent is in a range of from 220 to 280 nm,
   wherein a ratio ($D_{90}/D_{10}$) of a 90% cumulative average particle diameter ($D_{90}$) to a 10% cumulative average particle diameter ($D_{10}$) in a cumulative distribution curve of particle diameters of the light diffusing agent is in a range of from 1.2 to 2.59, and
   wherein the content proportion of the light diffusing agent is in a range of from 7.2 to 13.4 mass ppm, with respect to a total mass of the transparent resin composition.

* * * * *